(12) United States Patent
Yoshida et al.

(10) Patent No.: US 9,909,027 B2
(45) Date of Patent: Mar. 6, 2018

(54) SURFACE TREATMENT COMPOSITION

(71) Applicant: DAIKIN INDUSTRIES, LTD., Osaka-shi, Osaka (JP)

(72) Inventors: Tomohiro Yoshida, Settsu (JP); Dai Fukami, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/442,132

(22) PCT Filed: Nov. 5, 2013

(86) PCT No.: PCT/JP2013/079906
§ 371 (c)(1),
(2) Date: May 12, 2015

(87) PCT Pub. No.: WO2014/077155
PCT Pub. Date: May 22, 2014

(65) Prior Publication Data
US 2016/0289488 A1    Oct. 6, 2016

(30) Foreign Application Priority Data

Nov. 13, 2012 (JP) .................................. 2012-249395
Mar. 15, 2013 (JP) .................................. 2013-053793

(51) Int. Cl.
| C08K 3/00 | (2006.01) |
| C09D 133/16 | (2006.01) |
| C09D 7/12 | (2006.01) |
| C08F 299/00 | (2006.01) |
| C08F 299/08 | (2006.01) |
| C09D 201/02 | (2006.01) |
| C09D 201/04 | (2006.01) |
| C09D 183/04 | (2006.01) |
| C09D 5/00 | (2006.01) |
| G02B 1/18 | (2015.01) |
| C08G 77/20 | (2006.01) |

(52) U.S. Cl.
CPC ......... *C09D 133/16* (2013.01); *C08F 299/00* (2013.01); *C08F 299/08* (2013.01); *C09D 5/00* (2013.01); *C09D 7/12* (2013.01); *C09D 183/04* (2013.01); *C09D 201/02* (2013.01); *C09D 201/04* (2013.01); *G02B 1/18* (2015.01); *C08G 77/20* (2013.01)

(58) Field of Classification Search
USPC .................................................. 524/589, 366
See application file for complete search history.

(56) References Cited

U.S. PATENT DOCUMENTS

2004/0181008 A1* 9/2004 Hanazawa ......... C08G 18/2885
524/589

FOREIGN PATENT DOCUMENTS

| EP | 0 745 604 A2 | 12/1996 |
| EP | 745604 A2 * | 12/1996 |
| EP | 0 844 265 A1 | 5/1998 |
| EP | 884265 A1 * | 5/1998 |
| EP | 1 605 018 A1 | 12/2005 |
| EP | 2 130 850 A1 | 12/2009 |
| EP | 2130850 A1 * | 12/2009 |
| EP | 2 452 993 A2 | 5/2012 |
| JP | 2009-7488 A | 1/2009 |
| JP | 2010-024367 A | 2/2010 |
| JP | 2010-095695 A | 4/2010 |
| WO | 97/07155 A1 | 2/1997 |
| WO | 03/002628 A1 | 1/2003 |
| WO | WO-03/002628 A1 * | 1/2003 |
| WO | 2011/002668 A1 | 1/2011 |
| WO | 2012/024005 A2 | 2/2012 |

OTHER PUBLICATIONS

Communication dated Jun. 30, 2016 from the European Patent Office in counterpart Application No. 13855291.4.
International Preliminary Report on Patentability dated May 19, 2015, issued by the International Searching Authority in counterpart Application No. PCT/JP2013/079906.
International Search Report of PCT/JP2013/079906 dated Feb. 4, 2014.

* cited by examiner

*Primary Examiner* — Mark Kaucher
*Assistant Examiner* — Henry Hu
(74) *Attorney, Agent, or Firm* — Sughrue Mion, PLLC

(57) ABSTRACT

The present invention provides a composition which is able to form a layer having excellent surface slip property and friction durability in addition to water-repellency, oil-repellency and antifouling property. The present invention provides a surface-treatment composition comprising (A) at least one fluorine-containing polymer having a curable moiety, and (B) at least one silicon-containing polymer having a curable moiety.

13 Claims, No Drawings

SURFACE TREATMENT COMPOSITION

CROSS REFERENCE TO RELATED APPLICATIONS

This is a National Stage of International Application No. PCT/JP2013/079906 filed Nov. 5, 2013, claiming priority based on Japanese Patent Application No. 2012-249395 filed Nov. 13, 2012 and Japanese Patent Application No. 2013-053793 filed Mar. 15, 2013, the contents of all of which are incorporated herein by reference in their entirety.

TECHNICAL FIELD

The present invention relates to a surface treatment composition. In particular, the present invention relates to a surface treatment composition comprising a fluorine-containing polymer and a silicon-containing polymer.

BACKGROUND ART

A certain fluorine-containing silane compound is known to be able to provide excellent water-repellency, oil-repellency, antifouling property, or the like when it is used on a surface treatment of a base material. A layer formed from the surface treatment composition comprising a fluorine-containing silane compound is applied to various base materials such as a glass, a plastic, a fiber and a building material as a so-called functional thin film.

Conventionally, in particular, in use of an optical member, a base material formed of an inorganic glass has been used. In order to prevent adhering of a fouling such as fingerprints, a layer is formed by using a fluorine containing compound on the base material as an antifouling coating. As such fluorine containing compound, a surface treatment composition comprising a fluorine containing silane compound having a perfluoropolyether group and a hydroxyl group or a hydrolyzable group which bind to Si as an active ingredient is known (Patent Literature 1). However, in this case, since a bonding between a silanol group and a hydroxyl group are used, the base material is limited to glass, silicon, a metal oxide film, or the like.

On the other hand, recently, use of transparent plastics such as acrylic resin and polycarbonate has been expanded as a material in place of the inorganic glass since they are lightweight and processing of them is easy. It is desired to form the antifouling coating also when the resin material is used. However, since the fluorine containing silane compound as described in Patent Literature 1 is not conformable to the base material formed of the resin material, it is hard to fix on the surface of the base material. As a method of forming a layer less subjected to peeling on a surface of a base material formed of various materials such as resin, a method using a surface treatment composition comprising an acrylic hard coating agent and a perfluoropolyether derivative compatible and copolymerizable with the acrylic hard coating agent is known (Patent Literature 2).

PRIOR ART LITERATURE

Patent Literature

Patent Literature 1: WO 97/07155 A
Patent Literature 2: WO 03/002628 A1

SUMMARY OF THE INVENTION

Problem to be Solved by the Invention

However, recently, under a circumstance where a smartphone and a tablet terminal spread rapidly, with respect to use of a touch panel, it is desired to provide excellent touch sense when users touch to and operate the display panel with their finger, that is, excellent surface slip property, in addition, provide excellent friction durability so as to maintain such function even when it is subjected to repeated frictions. However, it is difficult that the conventional surface treatment composition sufficiently meets the increased requirements for both surface slip property and friction durability An object of the present invention is to provide a composition which is able to form a layer having excellent surface slip property and friction durability in addition to water-repellency, oil-repellency and antifouling property on a base material consisting of various materials comprising a resin.

Means to Solve the Problem

As a result of intensively studying, the inventors of the present invention have found that use of a composition comprising a fluorine-containing polymer having a curable moiety and a silicon-containing polymer having a curable moiety enables a formation of the layer having excellent surface slip property and friction durability in addition to water-repellency, oil-repellency and antifouling property on a surface of a base material even when the base material consists of various materials comprising a resin, and the inventors reach the present invention.

Therefore, according to first aspect of the present invention, there is provided a composition comprising:

(A) at least one fluorine-containing polymer having a curable moiety, and (B) at least one silicon-containing polymer having a curable moiety.

In one embodiment of the present invention, the above-mentioned composition wherein the fluorine-containing polymer (A) is at least one fluorine-containing polymer of any one of the following general formulae (A1), (A2) and (A3):

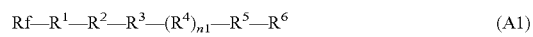  (A1)

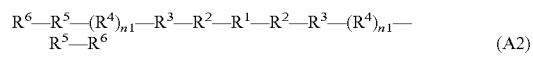  (A2)

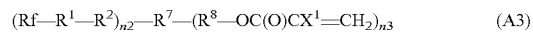  (A3)

wherein:

Rf represents an alkyl having 1-16 carbon atoms which may be substituted by one or more fluorine atoms, $R^1$ is a group of the following formula:

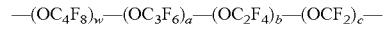

wherein a, b, c and w are each independently an integer of 0 or more and 200 or less, the sum of a, b, c and w is 1 or more and the occurrence order of the respective repeating units in parentheses is not limited in the formula, $R^2$ is a group of the following formula:

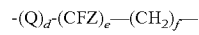

wherein Q represents an oxygen atom, phenylene, carbazolylene, $—NR^a—$ wherein $R^a$ represents a hydrogen atom or an organic group, or a divalent polar group, Z represents a hydrogen atom, a fluorine atom or a lower fluoroalkyl group, and d, e and f are each independently an integer of 0 or more and 50 or less, the sum of d, e and f is 1 or more, the occurrence order of the respective repeating units in parentheses is not limited in the formula, $R^3$ represents a divalent organic group, $R^4$ represents, each independently at each occurrence, $R^{4a}$ or $R^{4b}$: provided that at least one of $R^4$ is $R^{4a}$, $R^{4a}$ represents, each independently at each occurrence, a divalent organic group having a curable moiety, $R^{4b}$ represents, each independently at each occurrence, a divalent organic group having no curable moiety, n1 is an integer of 1 or more and 50 or less, $R^5$ represents —O—, —S—, —NH— or a bond, $R^6$ represents Rf—$R^1$—$R^2$ wherein Rf, $R^1$ and $R^2$ are as defined above, a monovalent organic group or a hydrogen atom, $R^7$ represents a n2+n3 valent organic group which may have a ring structure, a heteroatom and/or a functional group, $R^8$ represents a divalent organic group, $X^1$ represents a hydrogen atom, a chlorine atom, a fluorine atom, or an alkyl having 1-10 carbon atoms which may be substituted by a fluorine atom, n2 is an integer of 1 or more and 3 or less, and n3 is an integer of 1 or more and 3 or less.

In another embodiment of the present invention, the above-mentioned composition wherein the silicon-containing polymer (B) is at least one silicon-containing polymer of any one of the following general formulae (B1) and (B2):

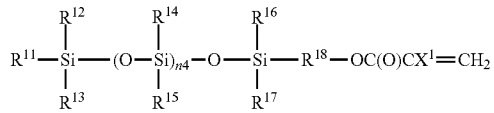

(B1)

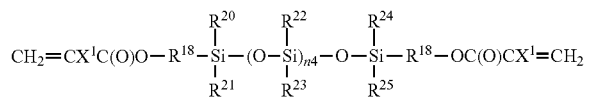

(B2)

wherein $R^{11}$, $R^{12}$, $R^{13}$, $R^{14}$, $R^{15}$, $R^{16}$, $R^{17}$, $R^{20}$, $R^{21}$, $R^{22}$, $R^{23}$, $R^{24}$ and $R^{25}$ represent each independently an alkyl group or an aryl group, $R^{18}$ represents a divalent organic group, $X^1$ represents a hydrogen atom, a chlorine atom, a fluorine atom, or an alkyl having 1-10 carbon atoms which may be substituted by a fluorine atom, and n4 and n5 are each independently an integer of 1 or more and 500 or less.

Effect of the Invention

According to the present invention, there is provided a composition comprising at least one fluorine-containing polymer having a curable moiety, and at least one silicon-containing polymer having a curable moiety. By using the composition of the present invention, a layer (hereinafter, referred to as a "surface-treating layer") having water-repellency, oil-repellency and antifouling property as well as excellent surface slip property and friction durability can be formed.

EMBODIMENTS TO CARRY OUT THE INVENTION

In the present specification, unless otherwise specified, "a perfluoropolyether group" means a monovalent or divalent "perfluoropolyether group (a perfluoro(poly)ether group)". The "monovalent perfluoropolyether group" means a perfluoroalkyl group in which an etheric oxygen atom is inserted into one or more carbon-carbon bonds. The "divalent perfluoropolyether group" means a perfluoroalkylene group in which an etheric oxygen atom is inserted into one or more carbon-carbon bonds. In the present specification, there is a case that a perfluoropolyether group is referred to as abbreviation: PFPE.

In the present specification, unless otherwise specified, examples of the "perfluoroalkyl group" include, for example, a perfluoroalkyl group having 1-12 carbon atoms (preferably 1-6, more preferably 1-3). The "perfluoroalkyl group" may be straight or branched, preferably straight.

In the present specification, the "perfluoroalkylene group" means a divalent group which is derived by removing a fluorine atom directly binding to a carbon atom of the main backbone of the perfluoroalkyl group. Examples of the "perfluoroalkylene group" include, unless otherwise specified, for example, a perfluoroalkylene group having 1-12 carbon atoms (preferably 1-6, more preferably 1-3). The "perfluoroalkylene group" may be straight or branched, preferably straight.

In the present specification, unless otherwise specified, examples of the "alkyl group", for example, an alkyl group having 1-12 carbon atoms (preferably, 1-6, more preferably 1-3, further preferably 1) (e.g. a methyl group, an ethyl group, a propyl group, an isopropyl group). The "alkyl group" may be straight or branched, preferably straight.

In the present specification, unless otherwise specified, "a hydrocarbon group" means a group containing a carbon atom and a hydrogen atom. Examples of the hydrocarbon group include, but are not particularly limited to, a hydrocarbon group having 1-20 carbon atoms which may be substituted by one or more substituents, for example, an aliphatic hydrocarbon group, an aromatic hydrocarbon group, and the like. The "aliphatic hydrocarbon group" may be straight, branched or cyclic, and may be saturated or unsaturated. The hydrocarbon group may contain one or more ring structures. It is noted that the hydrocarbon group may have one or more N, O, S, Si, amide, sulfonyl, siloxane, carbonyl, carbonyloxy, or the like at its end or in its molecular chain.

In the present specification, unless otherwise specified, examples of the substituents of the "hydrocarbon group" include, but are not particularly limited to, for example a halogen atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl group, and the like which may be substituted by one or more halogen atoms.

In the present specification, unless otherwise specified, "an organic group" or "a monovalent organic group" means a group containing a carbon atom. Examples of the "organic group" or the "monovalent organic group" include, but are not particularly limited to, the above-mentioned hydrocarbon group. "A divalent organic group" means a divalent group which is derived by further removing one hydrogen atom from the "monovalent organic group".

Hereinafter, the composition of the present invention will be described.

The present invention provides a composition comprising:

(A) at least one fluorine-containing polymer having a curable moiety (hereinafter, also referred to as "a fluorine-containing polymer (A)"), and (B) at least one silicon-containing polymer having a curable moiety (hereinafter, also referred to as "a silicon-containing polymer (B)").

The composition of the present invention is preferably used for treating a surface of a base material formed of various materials comprising a resin. That is, the composition of the present invention is used as a surface treatment composition.

In one embodiment, the fluorine-containing polymer (A) is at least one fluorine-containing polymer of any one of the following general formulae (A1), (A2) and (A3) (hereinafter, the compound represented by each formula is referred to as "a fluorine-containing polymer (A1)", "a fluorine-containing polymer (A2)", and "a fluorine-containing polymer (A3)", respectively).

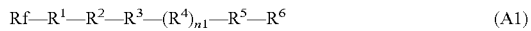

$$Rf-R^1-R^2-R^3-(R^4)_{n1}-R^5-R^6 \quad (A1)$$

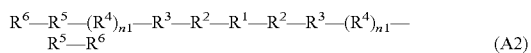

$$R^6-R^5-(R^4)_{n1}-R^3-R^2-R^1-R^2-R^3-(R^4)_{n1}-R^5-R^6 \quad (A2)$$

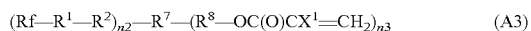

$$(Rf-R^1-R^2)_{n2}-R^7-(R^8-OC(O)CX^1=CH_2)_{n3} \quad (A3)$$

In the formulae (A1) and (A3), Rf represents an alkyl having 1-16 carbon atoms which may be substituted by one or more fluorine atoms.

The alkyl having 1-16 carbon atoms which may be substituted by one or more fluorine atoms is a straight or branched alkyl having 1-16 carbon atoms which may be substituted by one or more fluorine atoms, preferably a straight or branched alkyl having 1-3 carbon atoms which may be substituted by one or more fluorine atoms, more preferably, a straight alkyl having 1-3 carbon atoms which may be substituted by one or more fluorine atoms. The alkyl which may be substituted by one or more fluorine atoms is a fluoroalkyl group in which a terminal carbon atom is $CF_2H-$, and the other carbon atoms are fully substituted by a fluorine atom or a perfluoroalkyl group, more preferably a perfluoroalkyl group, in particular $-CF_3$, $-CF_2CF_3$ or $-CF_2CF_2CF_3$.

In the formulae (A1) to (A3), is a perfluoro(poly)ether group of the following formula.

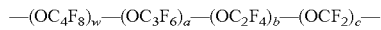

$$-(OC_4F_8)_w-(OC_3F_6)_a-(OC_2F_4)_b-(OCF_2)_c-$$

In the formula, a, b, c and w are each independently 0 or an integer of 1 or more and are not particularly limited as long as the sum of a, b, c and w is or more. Preferably, a, b, c and w are each independently an integer of 0 or more and 200 or less, more preferably each independently an integer of 0 or more and 100 or less. The sum of a, b, c and w is 1 or more and 1000 or less, preferably 1 or more and 500 or less, preferably 5 or more and 150 or less. The occurrence order of the respective repeating units in parentheses with the subscript a, b, c or w is not limited in the formula. Among these repeating units, the $-(OC_4F_8)-$ group may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$ and $-(OCF_2CF(C_2F_5))-$, preferably $-(OCF_2CF_2CF_2CF_2)-$. The $-(OC_3F_6)-$ group may be any of $-(OCF_2CF_2CF_2)-$, $-(OCF(CF_3)CF_2)-$ and $-(OCF_2CF(CF_3))-$, preferably $-(OCF_2CF_2CF_2)-$. The $-(OC_2F_4)-$ group may be any of $-(OCF_2CF_2)-$ and $-(OCF(CF_3))-$, preferably $-(OCF_2CF_2)-$.

In one embodiment, the perfluoro(poly)ether group is $-(OC_3F_6)_a-$ wherein a is an integer of 1 or more, preferably an integer of 1 or more and 100 or less. Preferably, $-(OC_3F_6)_a-$ is $-(OCF_2CF_2CF_2)_a-$.

In another embodiment, the perfluoro(poly)ether group is $-(OC_4F_8)_w-(OC_3F_6)_a-(OC_2F_4)_b-(OCF_2)_c-$ wherein a and w are each independently an integer of 0 or more and 30 or less, and b and c are each independently an integer of 1 or more and 300 or less, and the occurrence order of the respective repeating units in parentheses with the subscript a, b, c or w is not limited in the formula. Preferably, $-(OC_4F_8)_w-$ is $-(OCF_2CF_2CF_2CF_2)_w-$, $-(OC_3F_6)_a-$ is $-(OCF_2CF_2CF_2)_a-$, and $-(OC_2F_4)_b-$ is $-(OCF_2CF_2)_b-$.

A lower limit of a number average molecular weight of the perfluoro(poly)ether group of the formula: $-(OC_4F_8)_w-(OC_3F_6)_a-(OC_2F_4)_b-(OCF_2)_c-$ is preferably about 1,000, more preferably about 1,500, further preferably about 2,000 in view of obtaining high oil-repellency and high water-repellency. A higher limit is preferably about 100,000, more preferably about 50,000, further preferably about 10,000 in view of obtaining high solubility in a general-purpose solvent (a fluorine-free organic solvent).

In the formulae (A1) and (A2), $R^2$ is a group of the formula: $-(Q)_d-(CFZ)_e-(CH_2)_f-$. In the formula, d, e and f are each independently an integer of 0 or more and 50 or less, the sum of d, e and f is 1 or more, and the occurrence order of the respective repeating units in parentheses is not limited in the formula.

In the above formula, Q represents an oxygen atom, phenylene, carbazolylene, $-NR^a-$ wherein $R^a$ represents a hydrogen atom or an organic group, or a divalent polar group, preferably an oxygen atom or a divalent polar group, more preferably an oxygen atom.

Examples of the "divalent polar group" in Q include, but are not particularly limited to, $-C(O)-$, $-C(=NR^b)-$ and $-C(O)NR^b-$ wherein $R^b$ represents a hydrogen atom or a lower alkyl group. The "lower alkyl group" is, for example, an alkyl group having 1-6 carbon atoms, for example, methyl, ethyl, n-propyl, which may be substituted by one or more fluorine atoms.

In the above formula, Z represents a hydrogen atom, a fluorine atom or a lower fluoroalkyl group, preferably a fluorine atom.

The "lower fluoroalkyl group" is, for example, a fluoroalkyl group having 1-6 carbon atoms, preferably 1-3 carbon atoms, preferably a perfluoroalkyl group having 1-3 carbon atoms, more preferably a trifluoromethyl group, a pentafluoroethyl group, further preferably a trifluoromethyl group.

$R^2$ is preferably a group of the formula: $-(O)_d-(CF_2)_e-(CH_2)_f-$ wherein d, e and f are as defined above, and the occurrence order of the respective repeating units in parentheses is not limited in the formula.

Examples of the group of the formula: $-(O)_d-(CF_2)_e-(CH_2)_f-$ include, for example, $-(O)_{d'}-(CF_2)_{e'}-(CH_2)_{f'}-O-[(CH_2)_{f''}-O-]_{f'''}$ wherein d' is 0 or 1, e', f' and f'' is each independently an integer of 1-10, and f''' is 0 or 1.

In the formulae (A1) and (A2), $R^3$ represents a divalent organic group.

$R^3$ group is preferably $-C(R^{3a})(R^{3b})-$. In the formula, $R^{3a}$ and $R^{3b}$ are each independently a hydrogen atom or an alkyl group, preferably one of $R^{3a}$ and $R^{3b}$ is an alkyl group.

In the formulae (A1) and (A2), $R^4$ is, each independently at each occurrence, $R^{4a}$ or $R^{4b}$. However, one of $R^4$ is $R^{4a}$.

$R^{4a}$ represents, each independently at each occurrence, a divalent organic group having a curable moiety.

Examples of the "curable moiety" include, but are not particularly limited to, for example, an allyl group, a cinnamate group, a sorbate group, an acryloyl group and a methacryloyl group (hereinafter, the acryloyl group and the methacryloyl group are generally referred to as "a (meth) acryloyl group").

The preferable curable moiety varies depending on a material to be subjected to coating. For example, when the material is amorphous synthetic resin (e.g. an acrylic resin), the "curable moiety" is, preferably, an allyl group, a cinnamate group, a sorbate group or $CH_2=CX^1-C(O)-$ wherein X represents a hydrogen atom, a chlorine atom, a fluorine atom or an alkyl having 1-10 carbon atoms which may be substituted by a fluorine atom (e.g. a (meth)acryloyl group), more preferably an acryloyl group and a methacryloyl group.

$R^{4a}$ is preferably a group of the following formula:

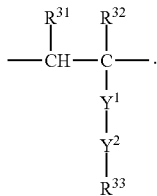

In the above formula, $R^{31}$ represents, each independently at each occurrence, a hydrogen atom or an alkyl group. $R^{31}$ is preferably a hydrogen atom.

In the above formula, $R^{32}$ represents, each independently at each occurrence, a hydrogen atom or an alkyl group. The $R^{32}$ is, preferably a methyl group or a hydrogen atom, more preferably, a hydrogen atom.

In the above formula, $R^{33}$ represents, each independently at each occurrence, an organic group having a curable moiety.

Examples of the curable moiety include the same group as the above-mentioned group, and are preferably $CH_2=CX^1-C(O)-$ wherein $X^1$ represents a hydrogen atom, a chlorine atom, a fluorine atom or an alkyl having 1-10 carbon atoms which may be substituted by a fluorine atom, specifically, $CH_2=C(CH_3)-C(O)-$ or $CH_2=CH-C(O)-$.

In the above formula, $Y^1$ represents $-O-$, $-N(R^c)-$, phenylene or carbazolylene. In the formula, $R^c$ represents an organic group, preferably an alkyl group.

$Y^1$ is preferably $-O-$, phenylene or carbazolylene, more preferably, $-O-$ or phenylene, further preferably $-O-$.

In the above formula, $Y^2$ represents a linker wherein the number of atoms of the main backbone is 1-16 (more preferably 2-12, further preferably 2-10). Examples of $Y^2$ include, but are not particularly limited to, for example, $-(CH_2-CH_2-O)_{p1}-$ (p1 represents an integer of 1-10, for example, an integer of 2-10), $-(CHR^d)_{p2}-O-$ (p2 is an integer of 1-40, and $R^d$ represents a hydrogen atom or a methyl group), $-(CH_2-CH_2-O)_{p3}-CO-NH-CH_2-CH_2-O-$ (p3 represents an integer of 1-10, for example, an integer of 2-10), $-CH_2-CH_2-O-CH_2-CH_2-$, $-(CH_2)_{p4}-$ (p4 represents an integer of 1-6), $-(CH_2)_{p5}-O-CONH-(CH_2)_{p6}-$ (p5 represents an integer of 1-8, preferably 2 or 4, and p6 represents an integer of 1-6, preferably 3) or $-O-$ (provided that $Y^1$ is not $-O-$).

Preferable $Y^2$ is $-(CH_2-CH_2-O)_{p1}-$ (p1 represents an integer of 1-10, for example an integer of 2-10) or $-(CHR^d)_{p2}-O-$ (p2 is an integer of 1-40, and $R^d$ represents a hydrogen atom or a methyl group), specifically, $-(CH_2-CH_2-O)_2-$ or $-CH_2-CH_2-O-$. It is noted that in these groups, the left terminal binds to the main backbone side ($Y^1$ side), and the right terminal binds to the curable moiety side ($R^{33}$ side).

$R^{4a}$ is more preferably a group of the following formula.

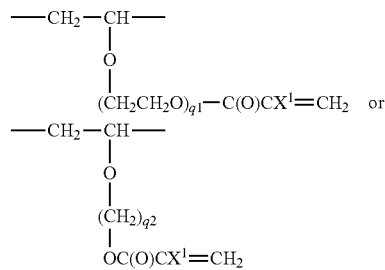

In the above formula, $X^1$ represents a hydrogen atom, a chlorine atom, a fluorine atom or an alkyl having 1-10 carbon atoms which may be substituted by a fluorine atom, preferably a hydrogen atom or an alkyl group having 1-10 carbon atoms, for example, a methyl group. In the above formula, q1 is an integer of 1-10, preferably an integer of 1-5, for example 1 or 2. q2 is an integer of 1-10, preferably an integer of 1-5, for example 2.

$R^{4b}$ is, each independently at each occurrence, a divalent organic group having no curable moiety.

$R^{4b}$ is preferably $-(CHR^{4c}-CR^{4d}R^{4e})_s-$. In the formula, $R^{4c}$ and $R^{4d}$ represent, each independently, a hydrogen atom or an alkyl group, s is an integer from 0 to 50, and $R^{4e}$ group is -Q'-$R^{4f}$. Q' has the same definition as that of Q and $R^{4f}$ is an organic group having no curable moiety, in which $R^{4g}$ group described below binds to Q' directly or via a linker.

The linker is preferably,
(a) $-(CH_2-CH_2-O)_{s1}-$ (s1 represents an integer of 1-10, for example, an integer of 2-10),
(b) $-(CHR^{4h})_{s2}-O-$ (s2 represents an integer of 1-40, and $R^{4h}$ represents a hydrogen atom or a methyl group),
(c) $-(CH_2-CH_2-O)_{s1}-CO-NH-CH_2-CH_2-O-$ (s1 is as defined above),
(d) $-CH_2-CH_2-O-CH_2-CH_2-$,
(e) $-(CH_2)_{s3}-$ (s3 represents an integer of 1-6),
(f) $-(CH_2)_{s4}-O-CONH-(CH_2)_{s5}-$ (s4 represents an integer of 1-8, preferably 2 or 4, and s5 represents an integer of 1-6, preferably 3), or
(g) $-O-$ (provided that Q' is not $-O-$).

$R^{4g}$ is preferably a following group.
(i) an alkyl group
For example: methyl, ethyl
(ii) a chain group containing an alkyl group substituted by fluorine atoms
For example:

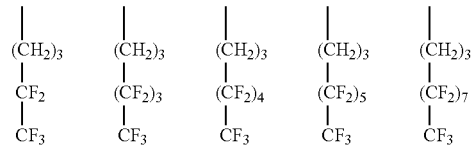

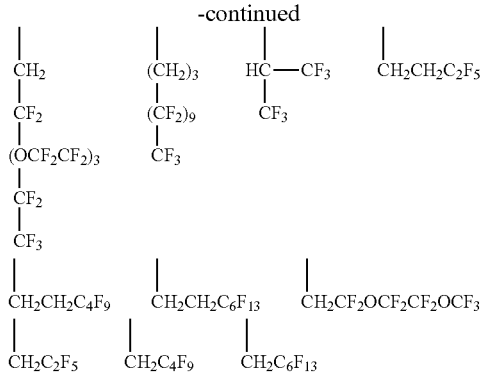
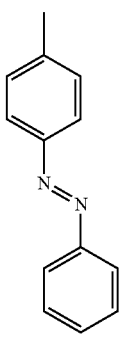

(iii) a group having one or more ring moieties selected from the group consisting of a monocyclic carbocyclic ring, a bicyclic carbocyclic ring, a tricyclic carbocyclic ring and a tetracyclic carbocyclic ring For example:

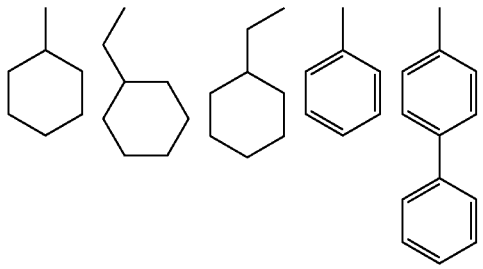

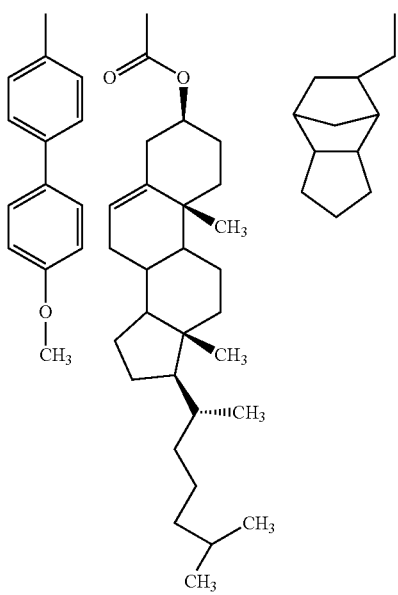

(iv) a group containing a hydrocarbon group substituted by one or more (preferably 1 or 2) carboxy groups For example:

(v) a group containing one or more (preferably 1) amino groups (vi) a hydrogen atom (vii) a group containing an imidazolium salt For example:

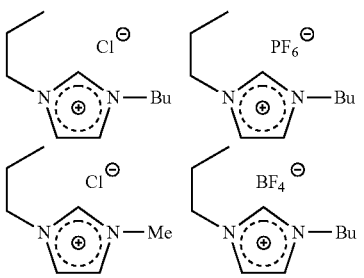

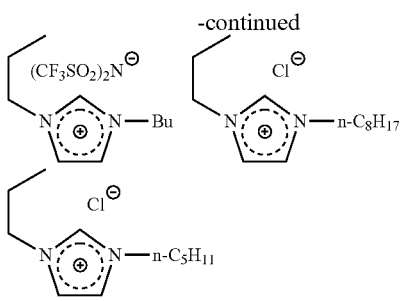

$R^{4g}$ is more preferably a hydrogen atom or an alkyl group which may be fluorinated and linked via an ethylene chain, more preferably, a hydrogen atom, a methoxyethyl group, an isobutyl group, or $R^{3i}$—$CF_2$—$(CF_2)_{s6}$—$(CH_2)_{s7}$—O—$(CH_2)_2$— ($R^x$ is a fluorine atom or a hydrogen atom, s6 is an integer of 0-6, and s7 is an integer of 1-6), further preferably, a 3-(perfluoroethyl)propoxyethyl group (rational formula: $CF_3$—$(CF_2)$—$(CH_2)_3$—O—$(CH_2)_2$—).

In the above $R^4$, a structural unit $R^{4a}$ and a structural unit $R^{4b}$ may form a block unit, respectively, or may be randomly linked.

In the formulae (A1) and (A2), n1 is an integer of 1 or more and 100 or less, preferably an integer of 1 or more and 50 or less, further preferably 2 or more and 30 or less.

In the formulae (A1) and (A2), $R^5$ represents —O—, —S—, —NH— or a bond, preferably —O—.

In the formulae (A1) and (A2), $R^6$ represents Rf—$R^1$—$R^2$ wherein Rf, $R^1$ and $R^2$ are as defined above, a monovalent organic group or a hydrogen atom.

$R^6$ is preferably an alkyl having 1-10 carbon atoms which may be substituted by a fluorine atom, more preferably, an alkyl group having 1-6 carbon atoms, further preferably methyl.

In the formula (A3), $R^7$ represents a n2+n3 valent organic group which may have a ring structure, a heteroatom and/or a functional group.

In the formula (A3), n2 is an integer of 1 or more and 3 or less.

In the formula (A3), n3 is an integer of 1 or more and 3 or less.

Preferably, n2+n3 is 3, for example, n2 is 1 and n3 is 2, or n2 is 2 and n3 is 1.

Examples of the "n2+n3 valent organic group which may have a ring structure, a heteroatom and/or a functional group" in $R^7$ include, for example, a group derived by removing "n2+n3-1" of hydrogen atoms from the monovalent organic group.

$R^7$ is preferably a group of the following formula.

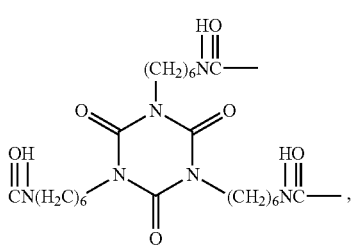

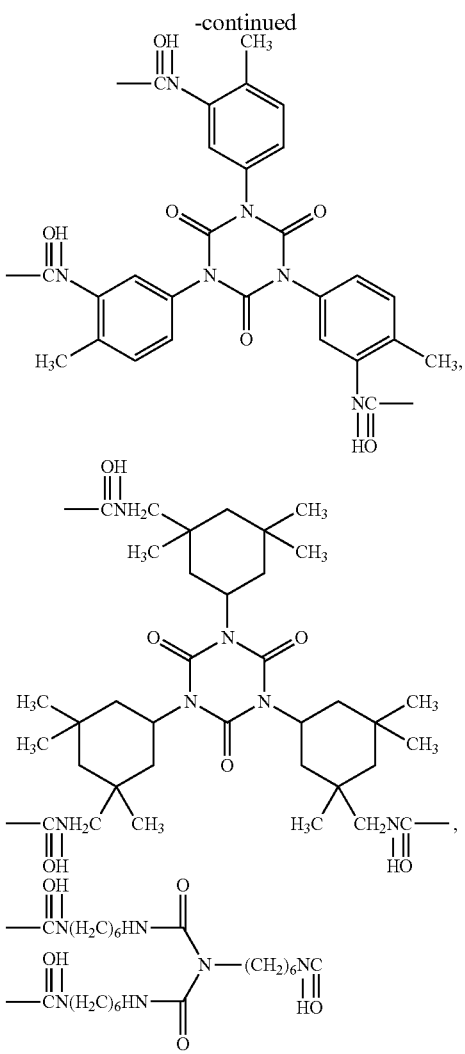

$R^7$ is more preferably a group of the following formula.

In the formula (A3), $R^8$ represents a divalent organic group. $R^8$ is preferably —O—$(CH_2)_r$— wherein r is an integer of 1 or more and 10 or less, preferably an integer of 1 or more and 3 or less, —NH—$(CH_2)_r$— wherein r is as defined above, more preferably, —O—$(CH_2)_r$— wherein r is an integer of 1 or more and 3 or less.

In the formula (A3), $X^1$ represents a hydrogen atom, a chlorine atom, a fluorine atom or an alkyl having 1-10 carbon atoms which may be substituted by a fluorine atom.

$X^1$ is preferably a hydrogen atom or an alkyl group having 1-10 carbon atoms, more preferably, a hydrogen atom or an alkyl group having 1-6 carbon atoms, further preferably a hydrogen atom or methyl.

In one embodiment, the fluorine-containing polymer (A1) and (A2) are at least one fluorine-containing polymer of any one of the following general formulae (A1a) and (A2a), respectively (hereinafter, the compound represented by each formula is referred to as "a fluorine-containing polymer (A1a)" and "a fluorine-containing polymer (A2a)", respectively)

Examples of the fluorine-containing polymer (A) contained in the composition of the present invention other than the compounds of the formulae (A1)-(A3) include further a curable fluoropolymer containing a perfluoroalkyl group, a curable fluoropolymer containing a fluorine-modified acryl, and the like. These compounds can be available, for example, as Megafac RS (trade name) series from DIC Corporation.

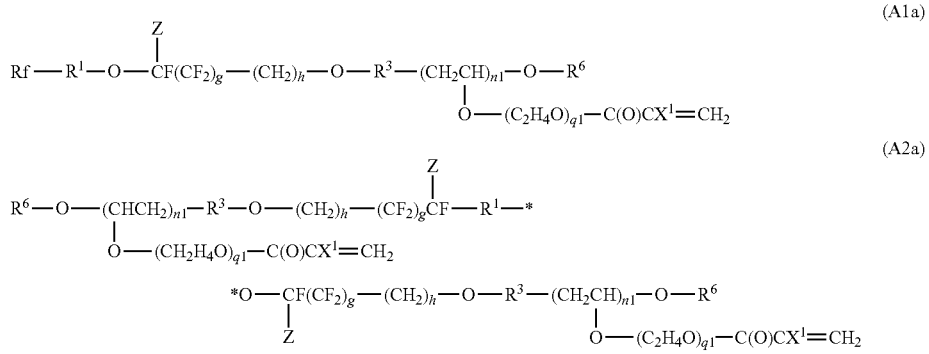

(A1a)

(A2a)

wherein Rf, $R^1$, $R^3$, $R^6$, $X^1$, Z and n1 are as defined above,
g is 0 or 1,
h is 1 or 2, and
q1 is one or more and 5 or less.

In another embodiment, the fluorine-containing polymer (A3) is at least one fluorine-containing polymer obtained by reacting:

(a) an NCO group present in triisocyanate prepared by trimerizing diisocyanate, with (b) an active hydrogen in at least one active hydrogen-containing compound of the following formula (a1) and/or (a2):

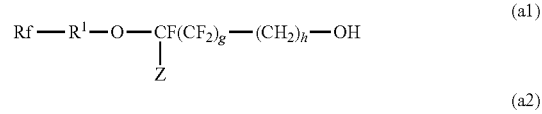

(a1)

(a2)

wherein Rf, $R^1$, Z, g and h are as defined above, and, at least one active hydrogen-containing compound of the following formula (a3):

$CH_2=CX^1C(O)O-R^{30}-OH$ (a3)

wherein $X^1$ is as defined above, and
$R^{30}$ is a divalent organic group.

In the formula (a3), $R^{30}$ is preferably $-(CH_2)_{r'}-$ wherein r' is 1 or more and 10 or less, preferably an integer of 1 or more and 3 or less, $-CH(CH_3)-$, $-CH(CH_2CH_3)-$, $-CH(CH_2OC_6H_5)-$, more preferably, $-(CH_2)_{r'}-$ wherein r' is an integer of 1 or more and 3 or less.

The fluorine-containing polymer (A) may have, but are not particularly limited to, a number average molecular weight of about $5 \times 10^2$ to $1 \times 10^5$. Among this range, it is preferable to have the number average molecular weight of about 2,000 to 10,000 in view of friction durability. The number average molecular weight can be measured by $^{19}$F-NMR.

Hereinafter, the process for producing a fluorine-containing polymer (A) will be described.

The fluorine-containing polymer of the general formulae (A1) and (A2) can be produced by a method comprising the following steps:

(1) cationic polymerizing a cationic polymerizable monomer in the presence of a perfluoropolyether group-containing cationic polymerization initiator and a Lewis acid (Step 1), and (2) stopping the cationic polymerization reaction by using a cationic polymerization terminator (Step 2).

(I) Step 1

(I-i) Perfluoropolyether Group-Containing Cationic Polymerization Initiator

The "perfluoropolyether group-containing cationic polymerization initiator" (initiating species) used in Step 1 is a cationic polymerization initiator containing a monovalent or divalent perfluoropolyether group.

Examples of the "cationic polymerization initiator containing a monovalent perfluoropolyether group" includes, for example, (a) a compound of the formula:

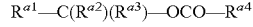

wherein $R^{a1}$ represents $Rf-R^1-R^2-$,
Rf, $R^1$ and $R^2$ are as described in the general formula (A1),
$R^{a2}$ represents a hydrogen atom or an alkyl group,
$R^{a3}$ represents a hydrogen atom or an alkyl group,
provided that at least one of $R^{a2}$ and $R^{a3}$ is an alkyl group, and
$R^{a4}$ represents an alkyl group or a perfluoroalkyl group, or (b) a compound of the formula:

wherein $R^{a1}$ represents $Rf-R^1-R^2-$,
Rf, $R^1$ and $R^2$ are as described in the general formula (A1),
$R^{a2}$ represents a hydrogen atom or an alkyl group,
$R^{a3}$ represents a hydrogen atom or an alkyl group, provided that at least one of $R^{a2}$ and $R^{a3}$ is an alkyl group, and $X^a$ represents a halogen atom.

Examples of the "cationic polymerization initiator containing a divalent perfluoropolyether group" includes, for example, (c) a compound of the formula:

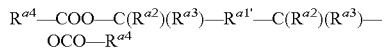

wherein $R^{a1'}$ represents —$R^2$—$R^1$—$R^2$—, $R^1$ and $R^2$ are as described in the general formula (A2), $R^{a2}$ represents a hydrogen atom or an alkyl group, $R^{a3}$ represents a hydrogen atom or an alkyl group, provided that at least one of $R^{a2}$ and $R^{a3}$ is an alkyl group, and $R^{a4}$ represents an alkyl group or a monovalent perfluoroalkyl group, or (d) a compound of the formula:

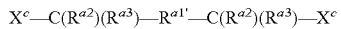

wherein $R^{a1'}$ represents —$R^2$—$R^1$—$R^2$—, $R^1$ and $R^2$ are as described in the general formula (A2), $R^{a2}$ represents a hydrogen atom or an alkyl group, $R^{a3}$ represents a hydrogen atom or an alkyl group, provided that at least one of $R^{a2}$ and $R^{a2}$ is an alkyl group, and $X^c$ represents a halogen atom.

When "the perfluoropolyether group-containing cationic polymerization initiator" is the cationic polymerization initiator containing a monovalent perfluoropolyether group, the compound can be produced by reacting a compound of the formula:

wherein $R^{a1}$ is as defined above, $R^{a2'}$ represents a hydrogen atom or an alkyl group, preferably a hydrogen atom, $R^{a3'}$ and $R^{a3''}$ represents each independently a hydrogen atom or an alkyl group, preferably a hydrogen atom, with an organic carboxylic acid (preferably carboxylic acid, trifluoroacetic acid, more preferably trifluoroacetic acid) or hydrogen halide.

For example, a compound of the formula:

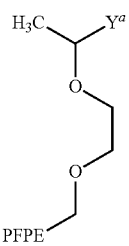

(I a)

wherein PFPE represents a perfluoropolyether group, and $Y^a$ represents an acyloxy group (e.g. $CF_3COO$), or a halogen atom, can be produced by a method comprising a step of reacting a vinyl ether compound a of the formula:

wherein PFPE is as defined above,
with a compound of the formula:

$Y^a$—H wherein $Y^a$ is as defined above (preferably, $CF_3COOH$).

On the other hand, when "the perfluoropolyether group-containing cationic polymerization initiator" is the cationic polymerization initiator containing a divalent perfluoropolyether group, the compound can be produced by reacting a compound of the formula:

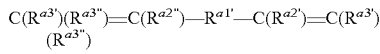

wherein $R^{a1'}$, $R^{a2'}$, $R^{a3'}$ and $R^{a3''}$ are as defined above, with an organic carboxylic acid (preferably acetic acid, trifluoroacetic acid ($CF_3COOH$), more preferably trifluoroacetic acid) or hydrogen halide.

For example, a compound of the formula:

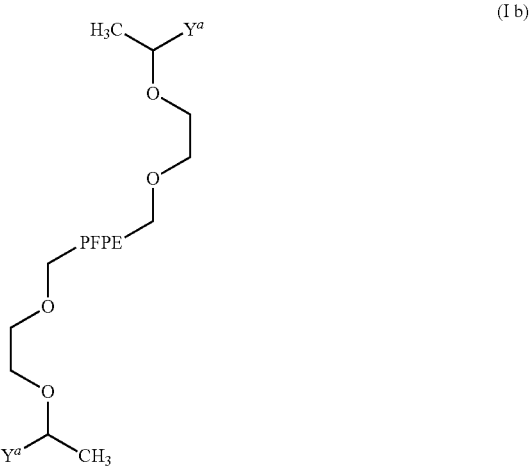

(I b)

wherein PFPE represents a divalent perfluoropolyether group, and $Y^a$ represents an acyloxy group (e.g. $CF_3COO$), or a halogen atom, can be produced by a method comprising a step of reacting a vinyl ether compound b of the formula:

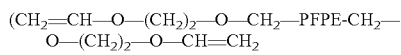

wherein PFPE is as defined above,
with a compound of the formula:

$Y^a$—H wherein $Y^a$ is as defined above (preferably, $CF_3COOH$).

It is preferable that the reaction is carried out in the presence of an acid in a solvent that does not adversely affect the reaction.

The acid is preferably a mineral acid such as hydrochloric acid. An amount used of the acid is usually 0.01-1,000 moles with respect to 1 mole of the vinyl ether compound a or the vinyl ether compound b.

The solvent is preferably a fluorine-containing solvent such as 1,1-dichloro-1,2,2,3,3-pentafluoropropane (hereinafter, also referred to as HCFC-225), hydrofluoroethers (hereinafter, also referred to as HFE), aliphatic perfluorohydrocarbons having 5-12 carbon atoms, aliphatic polyfluorohydrocarbons and 1,3-bistrifluoromethylbenzene A reaction temperature is usually −78 to 50° C., preferably −10 to 10° C.

A reaction time is usually from 1 minute to 60 minutes.

The monovalent perfluoropolyether group-containing cationic polymerization initiator corresponds to a moiety of the formula:

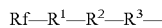

Rf—R$^1$—R$^2$—R$^3$— in the fluorine-containing polymer (A1).

The divalent perfluoropolyether group-containing cationic polymerization initiator corresponds to a moiety of the formula:

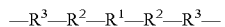

—R$^3$—R$^2$—R$^1$—R$^2$—R$^3$— in the fluorine-containing polymer (A2).

(I-ii) Cationic Polymerizable Monomer

The cationic polymerizable monomer used in Step 1 corresponds to R$^4$, that is, R$^{4a}$ or R$^{4b}$ in the general formulae (A1) and (A2).

For example, when a fluorine-containing polymer is produced wherein a structural unit R$^{4a}$ in R$^4$ in the general formulae (A1) and (A2) is a group of the formula:

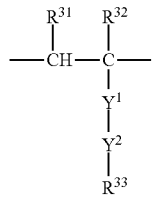

wherein R$^{31}$, R$^{32}$, R$^{33}$, Y$^1$ and Y$^2$ are as defined in R$^{4a}$ in the formulae (A1) and (A2), a compound of the following formula:

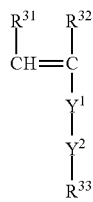

wherein R$^{31}$, R$^{32}$, R$^{33}$, Y$^1$ and Y$^2$ are as defined above is used as the cationic polymerizable monomer.

Preferable examples of a monomer corresponding to the structural unit R$^{4a}$ include the following compounds having a (meth)acryloyl group as the curable moiety.

(i) a vinyl ether compound the formula: CH$_2$=CH—O—(CHR$^{b1}$—CHR$^{b2}$—O)$_t$—C(O)CX$^1$=CH$_2$ wherein t is an integer of 1-10, preferably an integer of 1-5, R$^{b1}$ represents a hydrogen atom or methyl group, preferably a hydrogen atom, R$^{b2}$ represents a hydrogen atom or methyl group, preferably a hydrogen atom, and X$^1$ is as defined in the general formulae (A1) and (B1).

(ii) a vinyl ether compound the formula: CH$_2$=CH—O—(CHR$^{b1}$)$_t$—OC(O)CX$^1$=CH$_2$ wherein t is a repeating number of an integer of 1-40, preferably an integer of 2-10, R$^{b1}$ represents a hydrogen atom or a methyl group, preferably a hydrogen atom, and X$^1$ is as defined in the general formulae (A1) and (A2).

For example, when R$^4$ in the general formulae (A) and (B) contains the structural unit R$^{4b}$, a compound of the following formula:

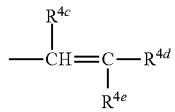

wherein R$^{4c}$, R$^{4d}$ and R$^{4e}$ are as defined above is used as the cationic polymerizing monomer.

Preferable examples of a monomer corresponding to the structural unit R$^{4b}$ include the following compounds having no curable moiety.

A compound of the formula (4b):

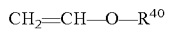

CH$_2$=CH—O—R$^{40}$ wherein

R$^{40}$ represents a monovalent organic group, provided that the monovalent organic group does not contain a —OH group, a —COOH group and a —NH$_2$ group.

Examples of the compounds include the following compounds.

(i) a vinyl ether compound of the formula:

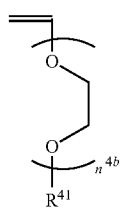

wherein n$^{4b}$ represents an integer of 1-10, and

R$^{41}$ represents an alkyl group.

Specific examples of the vinyl ether compound:

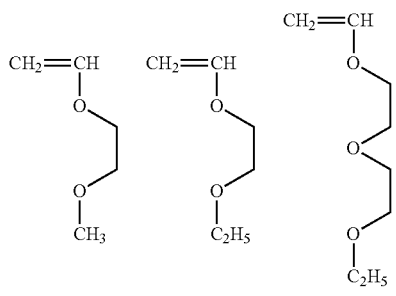

MOVE    EOVE    EOEOVE (ii) a vinyl ether compound of the formula:
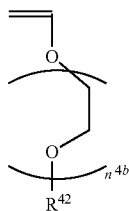
wherein
$n^{4b}$ represents an integer of 1-10, and
$R^{42}$ represents an alkyl group substituted by one or more fluorine atoms.
Specific examples of the vinyl ether compound:
5FVE
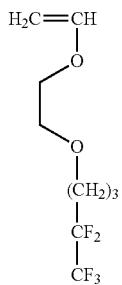
9FVE
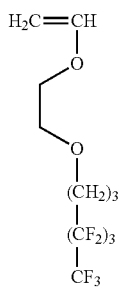
11FVE
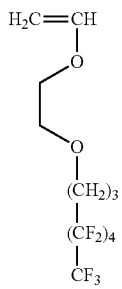
13FVE
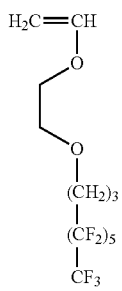
17FVE
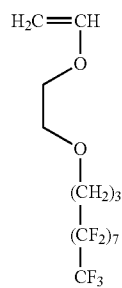
19FVE
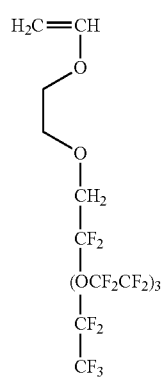
21FVE
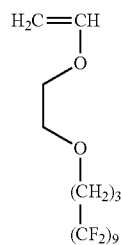
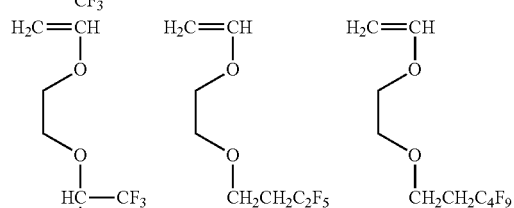
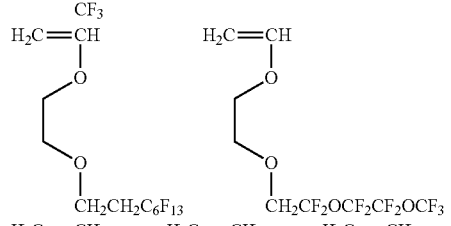
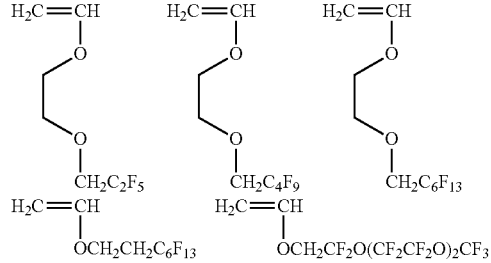

(iii) a vinyl ether compound containing at least one cyclic moiety selected from the group consisting of a monocyclic carbocyclic ring, a bicyclic carbocyclic ring, a tricyclic carbocyclic ring, and a tetracyclic carbocyclic ring.

Specific examples of the vinyl ether compound:

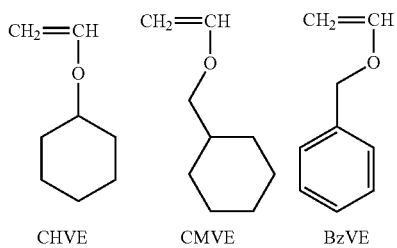

CHVE     CMVE     BzVE

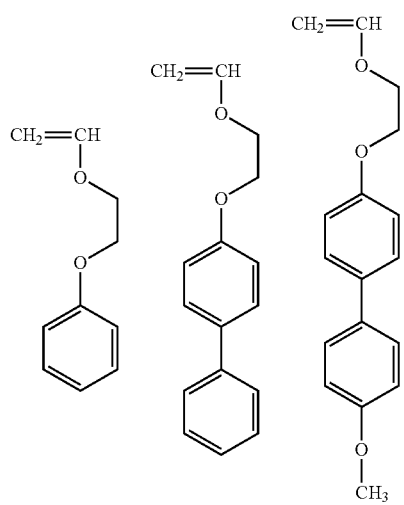

PhOVE     PBOVE     MOBPOVE

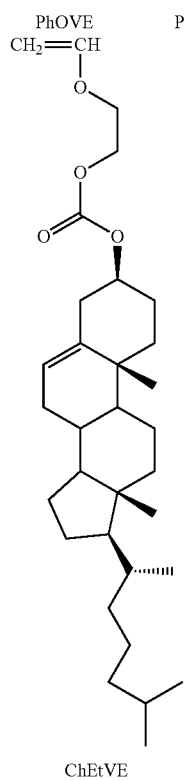

ChEtVE     TMMVE (iv) a vinyl ether compound of the formula:

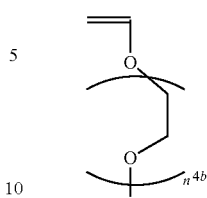

wherein
$n^{4b}$ represents an integer of 1-10, and
$R^{43}$ represents a hydrocarbon group substituted by one or more (preferably 1 or 2) alkoxycarbonyl groups.

Specific examples of the vinyl ether compound:

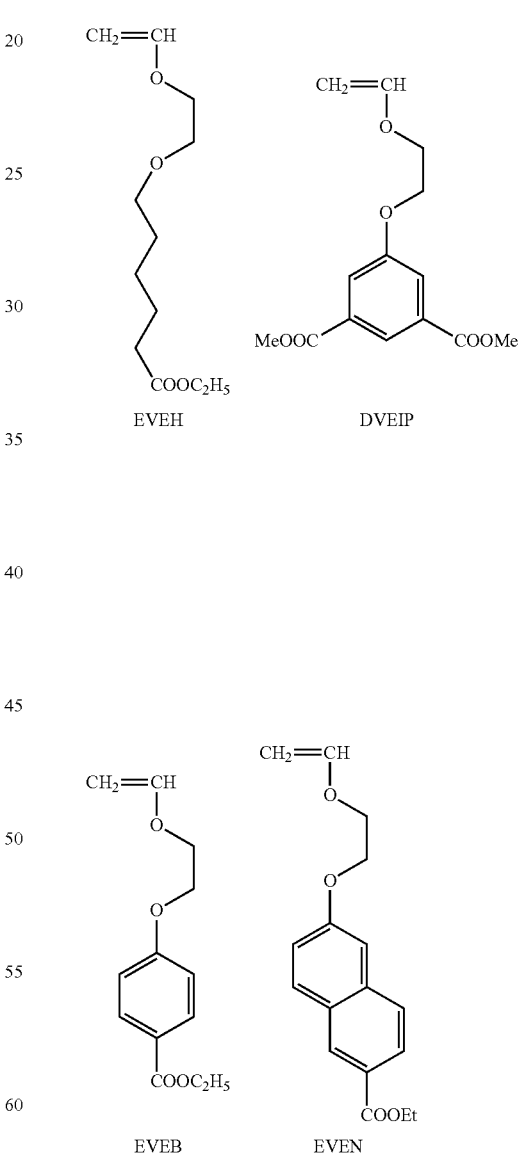

EVEH     DVEIP

EVEB     EVEN

When the vinyl ether compound is used, a carboxyl group can be introduced into the fluorine containing copolymer of the present invention by hydrolysis of the alkoxycarbonyl group after polymerization, if desired.

(v) a vinyl ether compound containing one or more (preferably 1) amino groups protected by imidization or amidation Specific examples of the vinyl ether compound:

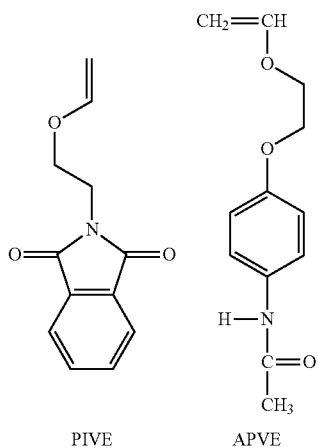 [SMILES: C=COCCN1C(=O)c2ccccc2C1=O ; C=COCCOc1ccc(NC(C)=O)cc1]

PIVE    APVE

When the vinyl ether compound is used, an amino group can be introduced into the fluorine containing copolymer of the present invention by deprotection of the protected amino group after polymerization, if desired.

(vi) a vinyl ether compound containing one or more (preferably 1) protected hydroxyl groups Specific examples of the vinyl ether compound:

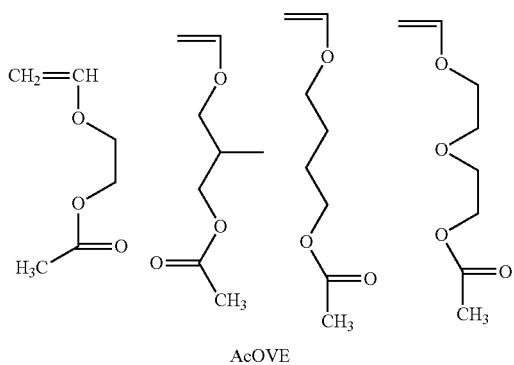

AcOVE

When the vinyl ether compound is used, a hydroxyl group can be introduced into the fluorine containing copolymer of the present invention by deprotection of the protected hydroxyl group after polymerization, if desired.

(vii) a vinyl ether compound containing an imidazolium salt

Specific examples of the vinyl ether compound:

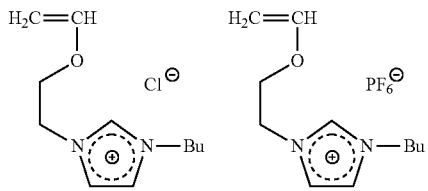

When a polymer wherein $R^4$ consists only of the structural unit $R^{4a}$ is synthesized, a monomer corresponding to the structural unit $R^{4a}$, for example, the above-mentioned monomer of the formula (4) is used as the cationic polymerizable monomer.

When a copolymer wherein $R^4$ comprises the structural unit $R^{4b}$ in addition to the structural unit $R^{4a}$ is synthesized, a monomer corresponding to the structural unit $R^{4b}$, for example, the above-mentioned monomer of the formula (4b) is used in addition to the monomer corresponding to the structural unit $R^{4a}$ as the cationic polymerizable monomer.

When a copolymer wherein each of the structural units $R^{4a}$ and $R^{4b}$ forms a block in $R^4$ is synthesized, the monomer corresponding to the structural unit $R^{4a}$ and the monomer corresponding to the structural unit $R^{4b}$ are sequentially cationic polymerized.

Specifically, only the first cationic polymerizable monomer (the monomer corresponding to the structural unit $R^{4a}$ or the monomer corresponding to the structural unit $R^{4b}$) is added to a reaction system to initiate polymerization. After the polymerization is complete, the second cationic polymerizable monomer (the monomer corresponding to the structural unit $R^{4b}$ or the monomer corresponding to the structural unit $R^{4a}$) is added to the reaction solution to proceed the polymerization of the second cationic polymerizable monomer since a cation is always present at the terminal of the polymer in the progress of a living cationic polymerization.

On the other hand, when a copolymer wherein the structural units $R^{4a}$ and $R^{4b}$ randomly are bonded in $R^4$ is synthesized as the fluorine-containing and silicon-containing polymer, both the monomer corresponding to the structural unit $R^{4a}$ and the monomer corresponding to the structural unit $R^{4b}$ are added to the reaction system to initiate a polymerization reaction.

The cationic polymerizable monomers are commercially available or can be produced by a known method.

An amount used of the cationic polymerizable monomer is appropriately determined depending on a structure of a fluorine-containing polymer of interest.

In the process for producing, since the living cationic polymerization is used, the repeating number of the structural units derived from the cationic polymerizable monomer can highly be controlled.

(I-iii) Lewis Acid

Examples the Lewis acid used in Step 1 include, for example, a compound of the formula (L1) described below and a compound of the formula (L2) described below.

Aluminum compound of the formula:

$$AlY^aY^bY^c \quad (L1)$$

wherein $Y^a$, $Y^b$ and $Y^c$ represent each independently a halogen atom, an alkyl group, an aryl group, an alkoxy group or an aryloxy group.

Examples of the "halogen atom" represented by $Y^a$, $Y^b$ and $Y^c$ include, for example, chlorine, bromine, iodine and the like.

Examples of the "alkyl group" represented by $Y^a$, $Y^b$ and $Y^c$ include, for example, an alkyl group having 1-10 carbon atoms.

Examples of the "aryl group" represented by $Y^a$, $Y^b$ and $Y^c$ include, for example, an aryl group having 6-10 carbon atoms.

Examples of the "alkoxy group" represented by $Y^a$, $Y^b$ and $Y^c$ include, for example, an alkoxy group having 1-10 carbon atoms.

Examples of the "aryloxy group" represented by $Y^a$, and $Y^c$ include, for example, an aryloxy group having 6-10 carbon atoms.

Specific examples of the luminum compound of the formula (L1) include, for example:
organic aluminum halide compounds such as diethyl aluminum chloride, diethyl aluminum bromide, diethyl aluminum fluoride, diethyl aluminum iodide, diisopropyl aluminum chloride, diisopropyl aluminum bromide, diisopropyl aluminum fluoride, diisopropyl aluminum iodide, dimethyl aluminum sesquichloride, methyl aluminum chloride, ethyl aluminum dichloride, ethyl aluminum dibromide, ethyl aluminum difluoride, ethyl aluminum diiodide, isobutyl aluminum dichloride, octyl aluminum dichloride, ethoxy aluminum dichloride, vinyl aluminum dichloride, phenyl aluminum dichloride, ethyl aluminum sesquichloride, ethyl aluminum sesquibromide, aluminum trichloride, aluminum tribromide, ethylaluminum ethoxy chloride, butyl aluminum butoxy chloride, ethyl aluminum ethoxy bromide; dialkoxyalkyl aluminums such as diethoxyethyl aluminum; and bis(alkyl-substituted aryloxy) alkyl aluminums such as bis(2,6-di-t-butyl-phenoxy)methyl aluminum, bis(2,4,6-tri-t-butylphenoxy)methyl aluminum, and the like.

These aluminum compounds may be used alone or may be used in combination of two or more.

Tetravalent titanium or tetravalent tin compound of the formula:

$$MZ^aZ^bZ^cZ^d \quad (L2)$$

wherein M represents tetravalent Ti or Sn, and $Z^a$, $Z^b$, $Z^c$ and $Z^d$ represent, each independently, a halogen atom, an alkyl group, an aryl group, an alkoxy group or an aryloxy group.

Examples of the "halogen atom", the "alkyl group", the "aryl group", the "alkoxy group" and the "aryloxy group" represented by $Z^a$, $Z^b$, $Z^c$ and $Z^d$ include one exemplified for $Y^a$, $Y^b$ and $Y^c$.

Specific examples of the tetravalent titanium compound of the formula (L2) include, for example:
titanium tetrahalides such as titanium tetrachloride, titanium tetrabromide, and titanium iodide;
halogenated titanium alkoxides such as titanium triethoxysilane chloride, and titanium tri-n-butoxide; and
titanium alkoxides such as titanium tetraethoxide and titanium n-butoxide.

Specific examples of the tetravalent tin compound of the formula (L2) include, for example:
tin tetrahalides such as tin tetrachloride, tin tetrabromide, and tin iodide.

These tetravalent titanium and tetravalent tin compounds may be used alone or may be used in combination of two or more.

Examples of the Lewis acid further include halides of iron (Fe), gallium (Ga), indium (In), zinc (Zn), zirconium (Zr), hafnium (Hf), bismuth (Si), silicon (Si), germanium (Ge), or antimony (Sb); onium salts (e.g. an ammonium salt, a phosphonium salt); and metal oxides (e.g. $Fe_2O_3$, $Fe_3O_4$, $In_2O_3$, $Ga_2O_3$, ZnO, and $Co_3O_4$, etc.).

An amount used of the Lewis acid is preferably an amount such that a cationic polymerizable monomer/a Lewis acid (molar ratio) is about 2-1,000, more preferably about 10-1,000.

(I-iv) Growing Species-Stabilizing Agent

In Step 1, in order to stabilize a growing species in the living cationic polymerization, an oxygen or nitrogen containing compound may be used.

The growing species means an activated species (cation) present at the end of a polymer which is growing.

Examples of the oxygen or nitrogen containing compound include, for example, esters, ethers, ketones, imides, phosphoric acid compounds, pyridine derivatives, and amines. Specifically, examples of the ester include, for example, ethyl acetate, butyl acetate, phenyl acetate, methyl chloroacetate, methyl dichloroacetate, ethyl butyrate, ethyl stearate, ethyl benzoate, phenyl benzoate, diethyl phthalate, and diethyl isophthalate.

Examples of the ether include, for example, chain ethers such as diethyl ether and ethylene glycol; and cyclic ethers such as dioxane and tetrahydrofuran.

Examples of the ketone include, for example, acetone and methyl ethyl ketone.

Examples of the imide include, for example, ethyl phthalimide.

Examples of the phosphoric acid compound include, for example, triethyl phosphate.

Examples of the pyridine derivative include, for example, 2,6-dimethyl pyridine.

Examples of the amine include, for example, tributylamine.

These compounds may be used alone or may be used in combination of two or more.

An amount used of the oxygen or nitrogen containing compound is preferably about 0.1-2,000 moles, more preferably about 1-2,000 moles with respect to 1 mole of a Lewis acid.

The reaction may be carried out in bulk, but preferably a solvent is used.

Examples of the solvent include, for example, aliphatic hydrocarbons such as n-pentane, n-hexane and cyclohexane; aromatic hydrocarbons such as benzene, toluene, 1,3-bistrifluoromethylbenzene and xylene; halogenated hydrocarbons such as carbon tetrachloride, methylene chloride, and dichloroethane; ethers such as dimethyl ether and hydrofluoroether. In particular, a non-polar solvent is preferable. These solvents may be used alone or may be used in combination of two or more.

With respect to an amount used of the solvent, usually the solvent:the vinyl compound (volume ratio) is 1:1 to 100:1, preferably 5:1 to 30:1.

A reaction temperature is usually −80° C. to 150° C., preferably −78 to 80° C.

A reaction time is usually 1 minute to 480 minutes, preferably 1 minute to 360 minutes.

(II) Step 2

(II-i) Cationic Polymerization Terminator

The "cationic polymerization terminator" used in Step 2 is a compound of the formula:

$$R^6—R^5—H$$

wherein $R^6$ and $R^5$ are as defined in the above-mentioned formulae (A1) and (A2).

When $R^6$ is a hydrogen atom, the cationic polymerization terminator is preferably water.

When $R^6$ is a monovalent organic group, the cationic polymerization terminator is preferably an alkanol of the formula: $R^g$—OH wherein $R^g$ is an alkyl group, preferably a methyl group.

An amount used of the cationic polymerization terminator is not strictly defined as long as it is possible to contact the terminator with the reactive end of the polymer in a reaction solution. The amount is usually about 0.01-10 times, preferably about 0.1-1 times the volume of the reaction solvent (III) Other Steps The fluorine-containing polymer of the general formulae (A1) and (A2) thus obtained can be purified by using a conventional method, if necessary.

The fluorine-containing polymer of the general formulae (A1) and (A2) produced by such process for producing has a high uniformity of the molecular weight. For example, a dispersity (weight average molecular weight/number average molecular weight) is within a range of about 2.5-1.0.

The fluorine-containing polymer of the above-mentioned general formula (A3) can be produced, for example, with reference to descriptions of WO 2003/002628 A or JP 2008-40262 A.

In one embodiment, the above-mentioned silicon-containing polymer (B) is one or more silicon-containing polymers of any one of the following formulae (B1) and (B2).

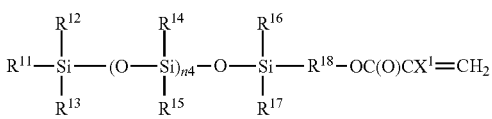

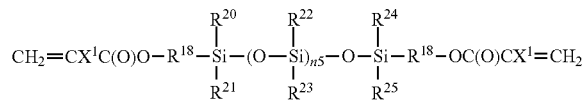

In the formulae (B1) and (B2), $R^{11}$, $R^{12}$, $R^{13}$, $R^{14}$, $R^{15}$, $R^{16}$, $R^{17}$, $R^{20}$, $R^{21}$, $R^{22}$, $R^{23}$, $R^{24}$ and $R^{25}$ represent each independently an alkyl group or an aryl group.

Examples of the alkyl group include, but are not particularly limited to, an alkyl group having 1-10 carbon atoms, and a cycloalkyl group having 3-20 carbon atoms, preferably an alkyl group having 1-6 carbon atoms, specifically, for $R^{11}$, an n-butyl group, and for $R^{12}$-$R^{17}$ and $R^{20}$-$R^{25}$, a methyl group.

Examples of the aryl group include, but are not particularly limited to, an aryl group having 6-20 carbon atoms. The aryl group may contain 2 or more rings. Preferable aryl group is a phenyl group.

The alkyl group and the aryl group may optionally contain a heteroatom, for example, a nitrogen atom, an oxygen atom or a sulfur atom in its molecular chain or ring.

Furthermore, the alkyl group and the aryl group may optionally be substituted by one or more substituents selected from a halogen; a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl which may be substituted by one or more halogens.

In the formulae (B1) and (B2), $R^{18}$ represents a divalent organic group.

$R^{18}$ is preferably —$(CH_2)_{r''}$— wherein r" is an integer of 1 or more and 20 or less, preferably 1 or more and 10 or less, more preferably —$(CH_2)_{r''}$— wherein r" is an integer of 1 or more and 10 or less.

In the formulae (B1) and (B2), $X^1$ represents a hydrogen atom, a chlorine atom, a fluorine atom, or an alkyl having 1-10 carbon atoms which may be substituted by a fluorine atom. Preferable $X^1$ is a hydrogen atom or an alkyl group having 1-10 carbon atoms, for example, a methyl group.

In the formulae (B1) and (B2), n4 and n5 are each independently an integer of 1 or more and 500 or less. n4 and n5 are preferably 1 or more and 200 or less, more preferably 10 or more and 200 or less.

The silicon-containing polymer (B) has a number average molecular weight of about 500-20,000, but are not particularly limited thereto. In order to provide the surface-treating layer with excellent surface slip property and friction durability, the number average molecular weight is preferably about 500 or more, for example, about 1,000 or more. In view of compatibility with the fluorine-containing polymer or the solvent, the number average molecular weight is preferably about 20,000 or less, preferably about 15,000 or less.

The silicon-containing polymer (B) is commercially available or can be produced by a known method. Examples of the commercially available silicon-containing polymer (B) include, but are not limited to, for example, X-22-164, X-22-164AS, X22-164A, X-22-164A, X-22-164B, X-22-164C, X-22-164E, X-22-174DX, X-22-2426 and X-22-2475 (manufactured by Shin-Etsu Chemical Co., Ltd.), FM-7711, FM-7721, FM-7725, FM-0711, FM-0721 and FM-0725 (manufactured by JNC Corporation) and DMS-R05, DMS-R11, DMS-R18, DMS-R22, DMS-R31 and DMS-U21 (manufactured by Gelest, Inc. Ltd.).

In the composition of the present invention, a weight ratio of the fluorine-containing polymer (A) to the silicon-containing polymer (B) is 10:1 to 1:10, preferably 10:1 to 2:1, for example, 10:1 to 3:1, specifically about 10:1. By setting the ratio at such a range, a surface-treating layer having excellent wiping property of fingerprints, surface slip property and appearance can be provided.

In the composition of the present invention, the fluorine-containing polymer (A) is contained preferably at 50% by mass or more, more preferably at 60% by mass or more with respect to the total mass of the fluorine-containing polymer (A) and the silicon-containing polymer (B). By setting the contents of the fluorine-containing polymer (A) at such a range, the surface-treating layer having higher transparent can be provided. It is noted that "transparent" only has to be generally recognized as transparent, and for example, its haze value is 3% or less.

The composition of the present invention may comprise one or more fluorine-containing oil (hereinafter, also referred to as a "fluorine-containing oil (C)") of the following general formula (C).

In the formula (C), Rf represents an alkyl having 1-16 carbon atoms which may be substituted by one or more fluorine atoms, and Rf' represents a hydrogen atom, a fluorine atom, or an alkyl having 1-16 carbon atoms which may be substituted by one or more fluorine atoms. Preferably, the alkyl which may be substituted by one or more fluorine atoms is a fluoroalkyl group in which a terminal carbon atom is $CF_2H-$, and the other carbon atoms are fully substituted by a fluorine atom or a perfluoroalkyl group, more preferably a perfluoroalkyl group. More preferably, Rf and Rf' are each independently a perfluoroalkyl group having 1-3 carbon atoms.

In the formula (C), a', b', c' and w' represent the repeating number of each of four repeating units of perfluoropolyether which constitute a main backbone of the polymer, and are each independently an integer of 0 or more and 300 or less, preferably an integer of 0 or more and 200 or less and the sum of a', b', c' and w' is at least 1, preferably 1-300. The occurrence order of the respective repeating units in parentheses with the subscript a', b', c' or w' is not limited in the formulae. Among these repeating units, the $-(OC_4F_8)-$ group may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$ and $-(OCF_2CF(C_2F_5))-$, preferably $-(OCF_2CF_2CF_2CF_2)-$. The $-(OC_3F_6)-$ group may be any of $-(OCF_2CF_2CF_2)-$, $-(OCF(CF_3)CF_2)-$ and $-(OCF_2CF(CF_3))-$, preferably $-(OCF_2CF_2CF_2)-$. The $-(OC_2F_4)-$ group may be any of $-(OCF_2CF_2)-$ and $-(OCF(CF_3))-$, preferably $-(OCF_2CF_2)-$.

Examples of the fluorine-containing oil of the above general formula (C) include a compound of any of the following general formulae (C1) and (C2) (which may be one compound or a mixture of two or more compounds).

$$Rf-(OCF_2CF_2)_{a''}-Rf' \quad (C1)$$

$$Rf-(OCF_2CF_2CF_2CF_2)_{w''}-(OCF_2CF_2CF_2)_{a''}-(OCF_2CF_2)_{b''}-(OCF_2)_{c''}-Rf' \quad (C2)$$

In these formulae, Rf and Rf' are as defined above; in the formula (C1), a" is an integer of 1 or more and 100 or less; and in the formula (C2), a" and w" are each independently an integer of 1 or more and 30 or less, and b" and c" are each independently an integer of 1 or more and 300 or less. The occurrence order of the respective repeating units in parentheses with the subscript a", b", c" or w" is not limited in the formulae.

The above-mentioned fluorine-containing oil (C) may have an average molecular weight of 1,000-30,000. By having such average molecular weight, high surface slip property can be obtained. Representatively, a compound of the general formulae (C1) and (C2) has preferably an average molecular weight of about 1,500 or more. In such range of the average molecular weight, high surface slip property can be obtained.

The fluorine-containing oil (C) may be contained in the composition of the present invention, for example, at 0-80 parts by mass, preferably 0-40 parts by mass with respect to 100 parts by mass of the fluorine-containing polymer (A) (as the total mass when two or more compounds are used; hereinafter the same shall apply).

The fluorine-containing oil (C) may be contained in the composition of the present invention, preferably at 40% by mass with respect to the total mass of the fluorine-containing polymer (A) and the fluorine-containing oil (C).

The fluorine-containing oil (C) contributes to increasing of surface slip property of the surface-treating layer.

The composition of the present invention may contain other components, for example, a silicone oil, an active energy curing initiator, and the like in addition to the above component.

Examples of the above-mentioned silicone oil include, for example, a liner or cyclic silicone oil having 2,000 or less siloxane bonds. The liner silicone oil may be so-called a straight silicone oil and a modified silicon oil. Examples of the straight silicone oil include dimethylsilicone oil, methylphenylsilicone oil, and methylhydrogensilicone oil. Examples of the modified silicone oil include that which is obtained by modifying a straight silicone oil with polyether, higher fatty acid ester, fluoroalkyl, amino, epoxy, carboxyl, alcohol, or the like. Examples of the cyclic silicone oil include, for example, cyclic dimethylsiloxane oil.

The silicone oil may be contained in the composition of the present invention (A), for example, at 0-50 parts by mass, preferably 0-10 parts by mass with respect to 100 parts by mass of the fluorine-containing polymer (A) (as the total mass when two or more compounds are used; hereinafter the same shall apply).

As the active energy curing initiator, for example, a compound is used which generates a radical or cation only by irradiation of an electromagnetic wave of 350 nm or less, that is, an ultraviolet light, an electron beam, an X-ray, a γ-ray, etc., and functions as a catalyst initiating curing (cross-linking reaction) of a curable moiety (for example, carbon-carbon double bond) in a fluorine-containing polymer having a curable moiety and a silicon-containing polymer having a curable moiety, usually a compound which generates a radical or cation, in particular a radical by irradiation of ultraviolet.

The active energy curing initiator in the composition of the present invention can be appropriately selected depending on a type of the curable moiety (radical reactive or cation reactive) of the fluorine-containing polymer (A), a type of the curable moiety of the silicon-containing polymer (B), a type or irradiation intensity of an active energy ray used (range of wavelength, etc.). Examples of the initiator which cures the fluorine-containing polymer (A) and the silicon-containing polymer (B) having the radical reactive curable moiety (carbon-carbon double bond) by using the active energy ray in ultraviolet range include, for example, the following compounds.

Acetophenones
acetophenone, chloroacetophenone, diethoxyacetophenone, hydroxyacetophenone, α-aminoacetophenone, hydroxypropiophenone, 2-methyl-1-[4-(methylthio)phenyl]-2-morpholinopropan-1-one, and the like.

Benzoins
benzoin, benzoin methyl ether, benzoin ethyl ether, benzoin isopropyl ether, benzoin isobutyl ether, benzyl dimethyl ketal, and the like.

Benzophenones
benzophenone, benzoyl benzoate, methyl benzoyl benzoate, 4-phenyl benzophenone, hydroxy benzophenone, hydroxy-propyl benzophenone, acrylated benzophenone, Michler's ketone, and the like.

Thioxanthones
thioxanthone, chlorothioxanthone, methylthioxanthone, diethylthioxanthone, dimethylthioxanthone, and the like.

Others
benzyl, α-acyloxime ester, acylphosphine oxide, glyoxy ester, 3-ketocoumarin, 2-ethylanthraquinone, camphorquinone, anthraquinone, and the like.

These active energy curing initiators may be used alone or may be used in combination of two or more.

The active energy curing initiator is contained at 0.01-30 parts by mass, preferably 0.1-20 parts by mass with respect to the total 100 parts by mass of the fluorine-containing polymer (A) and the silicon-containing polymer (B), and if present, the fluorine-containing oil (C), but are not particularly limited thereto.

The composition of the present invention may contain a solvent. The fluorine-containing polymer (A), in particular the fluorine-containing polymer of the general formulae (A1) and (A2), contained in the composition of the present invention has high solubility in not only a fluorine-containing organic solvent but also a fluorine-free organic solvent which is a general-purpose solvent, therefore, as the above solvent, the fluorine-containing organic solvent and the fluorine-free organic solvent can be used.

Examples of the fluorine-containing organic solvent include, for example, perfluorohexane, perfluorooctane, perfluoro-dimethyl cyclohexane, perfluorodecalin, perfluoroalkyl ethanol, perfluorobenzene, perfluorotoluene, perfluoroalkylamines (Fluorinert (trade name), etc.), perfluoroalkyl ethers, perfluorobutyl tetrahydrofuran, polyfluoro-aliphatic hydrocarbons (ASAHIKLIN AC6000 (trade name)), hydrochlorofluorocarbons (ASAHIKLIN AK-225 (trade name), etc.), hydrofluoroethers (Novec (trade name), HFE-7100 (trade name), etc.), 1,1,2,2,3,3,4-heptafluorocyclopentane, fluorine-containing alcohols, perfluoroalkyl bromide, perfluoroalkyl iodide, perfluoropolyether (Krytox (trade name), Demnum (trade name), Fomblin (trade name), etc.), 1,3-bistrifluoromethyl benzene, 2-(perfluoroalkyl)ethyl methacrylate, 2-(perfluoroalkyl)ethyl acrylate, perfluoroalkyl ethylene, Freon 134a, and hexafluoropropene oligomers.

Examples of the fluorine-free organic solvent include, for example, acetone, methyl isobutyl ketone, cyclohexanone, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether pentane, hexane, heptane, octane, dichloromethane, chloroform, carbon tetrachloride, dichloroethane, carbon disulfide, benzene, toluene, xylene, nitrobenzene, diethyl ether, dimethoxyethane, diglyme, triglyme, ethyl acetate, butyl acetate, dimethylformamide, dimethyl sulfoxide, 2-butanone, acetonitrile, benzonitrile, butanol, 1-propanol, 2-propanol, ethanol, methanol, and diacetone alcohol.

Among them, the solvent used in the composition of the present invention is preferably, methyl isobutyl ketone, propylene glycol monomethyl ether, hexadecane, butyl acetate, acetone, 2-butanone, cyclohexanone, ethyl acetate, diacetone alcohol or 2-propanol.

These solvents may be used alone or may be used in combination of two or more.

The solvent is contained at 5-10,000 parts by mass, preferably 5-5,000 parts by mass with respect to the total 100 parts by mass of the fluorine-containing polymer (A) and the silicon-containing polymer (B), and if present, the fluorine-containing oil (C).

In one embodiment, the composition of the present invention can be added to a matrix forming composition to provide a curable composition.

The curable composition contains the surface treatment composition of the present invention at 0.01-20% by mass, preferably 0.01-10% by mass, more preferably, 0.1-10% by mass.

The matrix forming composition means a composition containing a compound having at least one carbon-carbon double bond which is, but are not particularly limited to, for example, a monofunctional and/or polyfunctional acrylate and methacrylate (hereinafter, acrylate and methacrylate also generally referred to as "(meth)acrylate"), a monofunctional and/or polyfunctional urethane (meth)acrylate, a monofunctional and/or polyfunctional epoxy (meth)acrylate. Examples of the matrix forming composition include, but are not particularly limited to, a composition which is generally a hard coating agent or an antireflection agent, for example, a hard coating agent containing the polyfunctional (meth)acrylate or an antireflection agent containing a fluorine-containing (meth)acrylate. The hard coating agent is commercially available, for example, as Beam set 502H, 504H, 505A-6, 550B, 575CB, 577, 1402 (trade name) from Arakawa Chemical Industry Co., Ltd.; as EBECRYL40 (trade name) from Daicel Cytec company; and as HR300 series (trade name) from Yokohama Rubber Co., Ltd. The antireflection agent is commercially available, for example, as Optool AR-110 (trade name) from Daikin Industries, Ltd.

The composition and the curable composition of the present invention may further comprise an antioxidant, a thickener, a leveling agent, an antifoaming agent, an antistatic agent, an antifogging agent, an ultraviolet absorber, a pigment, a dye, an inorganic fine particle such as silica, an aluminum paste, a talc, a glass frit, a filler such as a metal powder, butylated hydroxy toluene (BHT) and a polymerization inhibitor such as phenothiazine (PTZ).

Next, the article of the present invention will be described.

The article of the present invention comprises a base material and a layer (surface-treating layer) which is formed from the composition or the curable composition of the present invention (hereinafter, the composition or the curable composition of the present invention are generally referred to as a "surface-treating composition") on the surface of the base material. This article can be produced, for example, as follows.

Firstly, the base material is provided. The base material usable in the present invention may be composed of any suitable material such as a glass, a resin (may be a natural or synthetic resin such as a common plastic material, preferably, a polycarbonate resin, a poly(meth)acrylate resin, a polyethylene terephthalate resin, a triacetyl cellulose resin, and may be in form of a plate, a film, or others), a metal (may be a simple substance of a metal such as aluminum, copper, or iron, or a complex such as alloy or the like), a ceramic, a semiconductor (silicon, germanium, or the like), a fiber (a fabric, a non-woven fabric, or the like), a fur, a leather, a wood, a pottery, a stone, an architectural member or the like.

For example, when an article to be produced is an optical member, a material constituting the surface of the base material may be a material for an optical member, for example, a glass or a transparent plastic. Furthermore, the base material may have an insulating layer, an adhesive layer, a protecting layer, a decorated frame layer (I-CON), an atomizing layer, a hard coating layer, a polarizing film, a phase difference film, a liquid crystal display module, and the like, depending on its specific specification.

The shape of the base material is not specifically limited. The region of the surface of the base material on which the surface-treating layer should be formed may be at least a part of the surface of the base material, and may be appropriately determined depending on use, the specific specification, and the like of the article to be produced.

Next, the film of the above surface-treating composition of the present invention is formed on the surface of the base material, and the film is post-treated, as necessary, and thereby the surface-treating layer is formed from the surface-treating composition.

The formation of the film of the surface-treating composition of the present invention can be performed by applying the above surface-treating composition on the surface of the base material such that the surface-treating composition coats the surface. The method of coating is not specifically limited. For example, a wet coating method or a dry coating method can be used.

Examples of the wet coating method include dip coating, spin coating, flow coating, spray coating, roll coating, gravure coating, micro-gravure coating, bar coating, die coating, screen printing and a similar method.

When the wet coating method is used, the surface-treating composition of the present invention is diluted with a solvent, and then it is applied to the surface of the base material. As the solvent, the above-mentioned fluorine-containing organic solvent and fluorine-free organic solvent can be used. In view of stability of the surface-treating composition of the present invention and volatile property of the solvent, the following solvents are preferably used: an aliphatic perfluorohydrocarbon having 5-12 carbon atoms (for example, perfluorohexane, perfluoromethylcyclohexane and perfluoro-1,3-dimethylcyclohexane); an aromatic polyfluorohydrocarbon (for example, bis(trifluoromethyl)benzene); an aliphatic polyfluorohydrocarbon; a hydrofluoroether (HFE) (for example, an alkyl perfluoroalkyl ether such as perfluoropropyl methyl ether ($C_3F_7OCH_3$), perfluorobutyl methyl ether ($C_4F_9OCH_3$), perfluorobutyl ethyl ether ($C_4F_9OC_2H_5$) and perfluorohexyl methyl ether ($C_2F_5CF(OCH_3)C_3F_7$) (the perfluoroalkyl group and the alkyl group may be liner or branched)), a hydrochlorofluorocarbon (ASAHIKLIN AK-225 (trade name)); a cellosolve solvent such as methyl cellosolve, ethyl cellosolve, methyl cellosolve acetate, ethyl cellosolve acetate; an ester solvent such as diethyl oxalate, ethyl pyruvate, ethyl-2-hydroxy butyrate, ethyl acetoacetate, ethyl acetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate, ethyl 2-hydroxyisobutyrate; a propylene glycol solvent such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether; a ketone solvent such as acetone, methyl ethyl ketone, methyl isobutyl ketone, 2-hexanone, cyclohexanone, methyl amino ketone, 2-heptanone; an alcohol solvent such as methanol, ethanol, propanol, isopropanol, butanol, diacetone alcohol; an aromatic hydrocarbon such as toluene, xylene, and the like. These solvents may be used alone or as a mixture of 2 or more compound. Among them, hydrofluoroether, the glycol solvent, the ester solvent, the ketone solvent and the alcohol solvent are preferable, and perfluorobutyl methyl ether ($C_4F_9OCH_3$) and/or perfluorobutyl ethyl ether ($C_4F_9OC_2H_5$), propylene glycol monomethyl ether, ethyl acetate, butyl acetate, propylene glycol monomethyl ether acetate, methyl isobutyl ketone, isopropanol, butanol and diacetone alcohol are particularly preferable.

Next, the film is post-treated. This post-treatment is performed by irradiation of, for example, an active energy ray, for example, an electromagnetic wave of 350 nm or less, that is, an ultraviolet light, an electron beam, an X-ray, a γ-ray, etc., but are not limited thereto. By performing such post-treatment, curing of a curable moiety in the fluorine-containing polymer having a curable moiety and the silicon-containing polymer having a curable moiety, and if present a curable moiety of the hard coating agent is initiated, so that a bond between these compounds or between these compounds and the base material is formed. Such post-treatment contributes to increasing of friction durability of the obtained surface-treating layer.

As described above, the surface-treating layer derived from the surface-treating composition of the present invention is formed on the surface of the base material to produce the article of the present invention. The surface-treating layer thus formed has high surface slip property (or lubricity, for example, wiping property of a fouling such as fingerprints and excellent tactile feeling in a finger) and high friction durability. Furthermore, this surface-treating layer may have water-repellency, oil-repellency, antifouling property (for example, preventing from adhering a fouling such as fingerprints) depending on a composition of the surface-treating composition used, in addition to high friction durability and surface slip property, thus may be suitably used as a functional thin film.

Therefore, the present invention further provides an optical material having the surface-treating layer on the outermost layer.

Examples of the optical material include preferably a variety of optical materials in addition to the optical material for displays, or the like exemplified in below: for example, displays such as a cathode ray tube (CRT; for example, TV, personal computer monitor), a liquid crystal display, a plasma display, an organic EL display, an inorganic thin-film EL dot matrix display, a rear projection display, a vacuum fluorescent display (VFD), a field emission display (FED; Field Emission Display), or a protective plate of such displays, or that in which these displays and protective plates have been subjected to antireflection treatment on their surface.

The article having the surface-treating layer obtained according to the present invention is not specifically limited to, but may be an optical member. Examples of the optical member include the followings: lens of glasses, or the like; a front surface protective plate, an antiscattering film, an antireflection plate, a polarizing plate, or an anti-glare plate on a display such as PDP and LCD; a touch panel sheet of an instrument such as a mobile phone or a personal digital assistance; a disk surface of an optical disk such as a Blu-ray disk, a DVD disk, a CD-R or MO; an optical fiber, and the like.

The thickness of the surface-treating layer is not specifically limited. For the optical member, the thickness of the surface-treating layer is within the range of 0.1-30 μm, preferably 0.5-20 μm, in view of optical performance, friction durability and antifouling property.

Hereinbefore, the article produced by using the surface-treating composition of the present invention is described in detail. It is noted that an application, a method for using or a method for producing the article are not limited to the above exemplification.

EXAMPLES
The composition of the present invention will be described in detail through Examples, although the present invention is not limited to Examples.
Synthesis Example
Synthesis of a Fluorine-Containing Polymer
According to the following processes, the fluorine-containing polymer (A) was prepared.
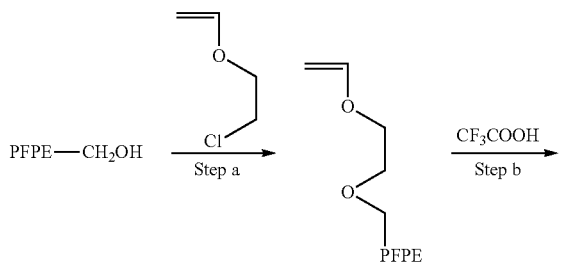
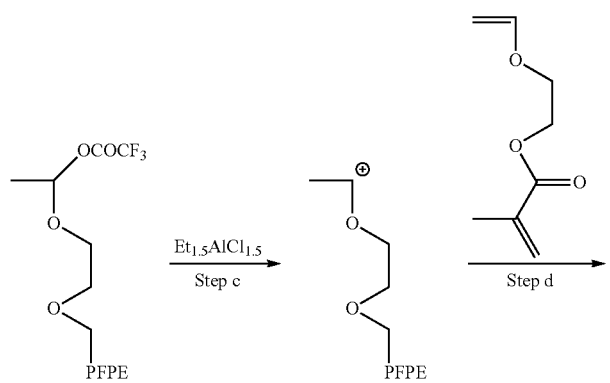
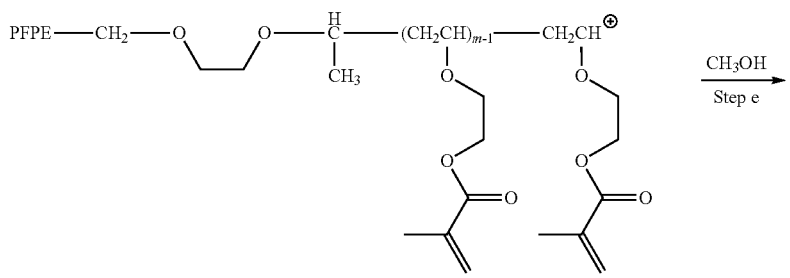
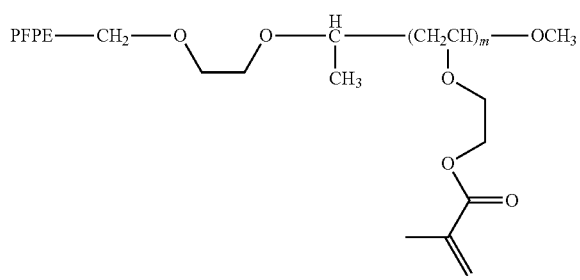

In the formula, PFPE represents a $CF_3CF_2CF_2O(CF_2CF_2CF_2O)_nCF_2CF_2-$ group, and m is an integer of 3-40.

Synthesis Example 1 (Step a): Synthesis of 2-[3-poly(perfluoropropoxy)-2,2,3,3-tetrafluoropropoxy]ethoxy Vinyl Ether

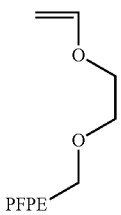

To 1 L of an eggplant flask, 60 g (15 mmol) of an perfluoropolyether containing alcohol of the following formula: PFPE-CH$_2$OH (Demnum SA (a number average molecular weight is 4000), Daikin Industries, Ltd.), 3.5 g (103 mmol) of tetrabutylammonium hydrogensulfate, 120 mL of 40% aqueous sodium hydroxide solution, and 250 mL of m-hexafluoroxylene were added, and stirred for 30 minutes at a room temperature under a nitrogen atmosphere. To the mixture, 120 mL of 2-chloroethylvinyl ether was added, a dimroth condenser was attached to the eggplant flask, and the mixture was stirred under a nitrogen atmosphere at 70° C. for 48 h. After cooling, the solvent was evaporated with an evaporator until the reaction solution was almost dissolved in a fluorine-based inert liquid (Fluorinert FC-72, Sumitomo 3M Ltd.). This solution was extracted with dichloromethane 3 times so that the contaminants were removed. The removal of the contaminants was confirmed by subjecting the extracts to a TLC (eluent: HCFC-225, detecting method: spraying potassium permanganate solution and heating, Evaluation criteria: disappearance of an original spot). The solvent was distilled off under a reduced pressure to obtain 2-[3-poly(perfluoropropoxy)-2,2,3,3-tetrafluoropropoxy]ethylvinyl ether of interest.

Hereinafter, 2-[3-poly(perfluoropropoxy)-2,2,3,3-tetrafluoropropoxy]ethylvinyl ether is referred to as PFPE 4000 VE.

The structure of the interest compound was confirmed by an NMR spectrum.

The NMR spectrum were obtained by JEOL model JNM-ECS400 (measurement solvent: CDCl$_3$-hexafuluorobenzene (1:5)).

With respect to the chemical shifts, a reference substance was TMS in $^1$H-NMR, and CFCl$_3$ in $^{19}$F-NMR, and a downfield side was defined as positive.

$^1$H-NMR (CDCl$_3$—C$_6$F$_6$): δ 3.86-3.91 (2H, m), 3.91-3.96 (3H, m), 4.08 (2H, t, J=13.5 Hz), 4.13 (1H, d-d, J=14.7, 1.8 Hz), 6.40 (1H, d-d, J=14.7, 6.6 Hz)

$^{19}$F-NMR (CDCl$_3$—C$_6$F$_6$): δ −83.12 (s), −84.27 (s), −84.52 (s), −84.82 (s), −85.06 (s), −85.50 (s), −87.36 (t, J=12.5 Hz), −125.65 (t, J=13.5 Hz), −130.61 (s), −130.69 (s), −130.79 (s), −131.57 (s)

A peak of a CF$_2$ group at the β position of the starting alcohol (triplet peak at −128.33 ppm) disappeared, and a triplet peak at −125.65 ppm was detected, thereby confirming the formation of an ether group.

Synthesis Example 2 (Step b): Synthesis of a PFPE Group Containing Cationic Polymerization Initiator (Concentration: 100 mol/l)

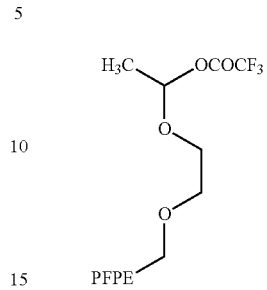

Glasswares for synthesis and polymerization were used after they are dried for 3 hours in a forced convection oven (130° C.)

Glass reaction containers A and B provided with three-way stopcock were heated under a nitrogen gas stream, cooled to a room temperature under a nitrogen pressure and making the inner pressure to an atmospheric pressure with a dried nitrogen to sufficiently dry the inside of the containers.

To container A, 19.7 mL of HCFC-225 and 0.3 mL (4 mmol) of trifluoroacetic acid were added under a dried nitrogen and sufficiently stirred to obtain 20 mL (200 mol/l) of solution A. To glass container B, 5.9 mL of HCFC-225 and 4.1 mL (2 mmol) of PFPE 4000 VE were added and sufficiently stirred to obtain 10 mL (200 mol/l) of solution B. The diluted solution A and solution B were cooled in an ice-water bath at 0° C. for about 15 minutes. Cooled solution A was slowly added to solution B over about 5 minutes with a nitrogen flow and stirred for 10 minutes to synthesize a PFPE group containing cationic polymerization initiator (obtained amount: 19.5 ml, yield: not less than 99.5%).

Hereinafter, this PFPE group containing cationic polymerization initiator is referred to as PFPE 4000 VETFA.

When PFPE 4000 VETFA was stored, purified PFPE 4000 VETFA was diluted with HCFC-225 to 0.1 M, and added to a brown glass ampule under a dried nitrogen and heat-sealed, and stored at a cold dark place.

Synthesis Example 3 (Steps c-e): Synthesis of a Fluorine-Containing Polymer

Glasswares for synthesis and polymerization were used after they are dried for 3 hours in a forced convection oven (130° C.)

Glass reaction containers A and B provided with three-way stopcock were heated under a nitrogen gas stream, cooled to a room temperature under a nitrogen pressure and making the inner pressure to an atmospheric pressure with a dried nitrogen to sufficiently dry the inside of the containers.

To the container, 2.0 mL of PFPE 4000 VETFA (pre-diluted with HCFC-225 to 0.1 mol/L) (corresponding to 0.2 mmol) as a PFPE group containing cationic polymerization initiator, 5.88 mL of HCFC-225 and 1.0 mL of 1,4-dioxane as a polymerization solvent were added under a dried nitrogen. Furthermore, 0.12 mL (1 mmol) of 2-(vinyloxy)ethylmethacrylate diluted 2-fold with HCFC-225 (0.24 mL as the HCFC-225 solution) as a monomer having a curable moiety was added under a dried nitrogen. The total volume was made to 9.0 mL, and the mixture was cooled to 0° C., and stirred with a magnetic stirrer under a nitrogen pressure and on an ice to be allowed to constant temperature of 0° C.

To this, 1 mL (0.2 mmol) of ethyl aluminum sesquichloride ($Et_{1.5}AlCl_{1.5}$) which was pre-diluted with HCFC-225 as a polymerization solvent and allowed to constant temperature of 0° C. was quickly added under a dried nitrogen to initiate polymerization. After 60 minutes, 1% of ammonia in methanol was added to stop polymerization.

The produced polymer was purified as follows. Firstly, the reaction solution after polymerization was stopped was diluted with HCFC-225. To remove a catalyst residue, a small amount of methanol was added, and the solution was washed with 0.6N HCl aqueous solution 6 times, and with an ion-exchanged water 3 times or more until the washing solution was neutral. This solution was transferred to a eggplant flask, and the solvent, the unreacted monomers and the added base were distilled off under reduced pressure. Then, the product was shut away from light and stored in refrigerator.

It was confirmed by the NMR measurement that the produced polymer had a curable moiety based on absence of the starting species and presence of a peak of C=C of a methacrylate group.

For the produced polymer, a conversion rate of the monomer (polymerization rate, Conversion) was calculated by using a gravimetric method, and a number average molecular weight (Mn) and Dispersity (Mw/Mn) of the polymer were calculated by using a gel permeation chromatography (GPC).
Conversion rate: 100
Number average molecular weight (Mn): 4600
Dispersity (Mw/Mn): 1.09

Synthesis Example 4 Synthesis of Other Fluorine-Containing Polymer

A fluorine-containing polymer was synthesized similarly to the above except that 0.15 mL (1 mmol) of 2-(2-vinyloxyethoxy)ethyl methacrylate of the following formulae diluted 2-fold with HCFC-225 (0.24 mL as the HCFC-225 solution) as the monomer having a curable moiety was used in place of 2-(vinyloxy)ethylmethacrylate diluted 2-fold with HCFC-225 in Step d in Synthesis Example 3.

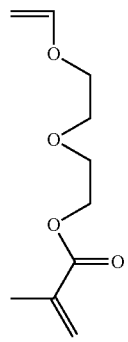

Conversion rate: 100
Number average molecular weight (Mn): 5600

Example 1

The fluorine-containing polymer (0.3 g) prepared in Synthesis Example 3 and FM-0725 (manufactured by JNC Ltd.) (0.03 g) as a silicon-containing polymer were mixed to obtain the composition of the present invention.

Such composition was added to a hard coating agent (Beamset 575CB (trade name), manufactured by Arakawa Chemical Industries, Ltd.) (29.67 g) and dissolved in methyl isobutyl ketone (87.5 mL) to obtain 30% by mass of a curable composition.

Example 2

The curable composition of Example 2 was prepared similarly to Example 1 except that Optool DAC-HP (trade name, Daikin Industries Ltd.) (1.5 g) was used in place of the fluorine-containing polymer prepared in Synthesis Example 3 and methyl isobutyl ketone (85.8 mL) was used.

Example 3

The curable composition of Example 3 was prepared similarly to Example 1 except that the fluorine-containing polymer (0.3 g) prepared in Synthesis Example 4 was used in place of the fluorine-containing polymer prepared in Synthesis Example 3.

Comparative Examples 1-4

The curable compositions of Comparative Examples 1-4 were prepared similarly to Example 1 except that the fluorine-containing polymer prepared in Synthesis Example 3 alone (0.3 g) (Comparative Example 1), Optool DAC alone (1.5 g) (Comparative Example 2), the silicon-containing polymer used in Example 1 alone (0.3 g) (Comparative Example 3) or the fluorine-containing polymer prepared in Synthesis Example 4 alone (0.3 g) (Comparative Example 4) in place of the composition of the present invention were added to the hard coating agent.

Experiment

Formation of the Surface-Treating Layer

A base material of polycarbonate (Stella, manufactured by Nippon Test Panel Co., Ltd.) was immersed in the curable compositions obtained in Examples 1-3 and Comparative Examples 1-4, and dried at 70° C. for 5 minutes. Then, ultraviolet ray of 1 J/cm² was irradiated to form a surface-treating layer.

Evaluation

Evaluation of Contact Angle

Static contact angles of water and n-hexadecane (water contact angle and n-hexadecane contact angle) were measured for 1 µL by using a contact angle measuring instrument (manufactured by KYOWA INTERFACE SCIENCE Co., Ltd.). The results are shown in Table 2 below.

Evaluation of Friction Durability

As an evaluation of the friction durability, a steel wool friction durability evaluation was performed. Specifically, the base material on which the surface-treating layer was formed was horizontally arranged, and then, a steel wool (grade No. 0000, dimensions: 10 mm×10 mm×5 mm) was contacted with the exposed surface of the surface-treating layer and a load of 1000 gf was applied thereon. Then, the steel wool was shuttled at a rate of 140 mm/second while applying the load. The static contact angle of water (water contact angle) was measured per 1.00 shuttling. The rubbing number when the measured value of the contact angle became to be less than 100 degree was defined as the number of friction durability. The results are shown in Table 2 below.

Evaluation of Surface Slip Property

Coefficient of dynamic friction (−) was measured by using a surface texture measurement instrument (TriboGear TYPE: 14FW; manufactured by SHINTO Scientific Co. Ltd.) using a steel ball as a friction probe according to ASTM D1894. The results are shown in Table 2 below.

Evaluation of Repelling Property and Wiping Property of an Oil-Based Ink

A line was drawn on the surface-treating layer with an oil pen (Mckee (trade name), manufactured by Zebra Co., Ltd.), and the repelling property and the state of the surface-treating layer after allowing the surface-treating layer to stand for one minute and wiping the adhered ink tree times with Kimwipe (trade name, manufactured by Jujo-Kimberly Co., Ltd) were visually evaluated.

Evaluation criteria are as follows.

TABLE 1

| | Repelling property | Wiping property |
|---|---|---|
| ◎ | extremely repel | easily wipeable |
| ○ | repel | wipeable |
| Δ | slightly repel | remaining a few ink |
| X | not repel | not wipeable |

The above results are shown in Table 2.

TABLE 2

| | Contact angle (degree) | | Coefficient of | | Oil-based ink | |
|---|---|---|---|---|---|---|
| | water | n-hexa decane | Friction durability | dynamic friction | Repelling property | Wiping property |
| Example 1 | 110 | 65 | 500 times | 0.044 | ◎ | ◎ |
| Example 2 | 109 | 65 | 300 times | 0.075 | ○ | ○ |
| Example 3 | 109 | 65 | 500 times | 0.044 | ◎ | ◎ |
| Comparative Example 1 | 105 | 61 | less than 100 times | 0.104 | ○ | ○ |
| Comparative Example 2 | 108 | 65 | 100 times | 0.096 | Δ | Δ |
| Comparative Example 3 | 89 | 23 | less than 100 times | 0.059 | X | X |
| Comparative Example 4 | 103 | 57 | less than 100 times | 0.110 | ○ | ○ |

As understood from Table 2, it was confirmed that in Examples 1-3 in which the fluorine-containing polymer and the silicon-containing polymer were used in combination, friction durability was remarkably increased in comparison with that in Comparative Examples 1-4 in which these compounds was used alone, respectively. In addition, in Examples 1-3, both the contact angle and the coefficient of dynamic friction were increased in comparison with those in Comparative Examples 1, 2 and 4 in which the fluorine-containing polymer was used alone. In particular, in Examples 1 and 3, both the contact angle and the coefficient of dynamic friction were increased in comparison with those in Comparative Examples 1, 4 and 3 in which the fluorine-containing polymer or the silicon-containing polymer was contained alone. Therefore, synergistic effect was confirmed.

Although the present invention is not bound to any theory, the reason for obtain such effects can be considered as follows. A surface segregation of the fluorine-containing polymer was increased by combination of the fluorine-containing polymer and the silicon-containing polymer, thereby increasing the water contact angle. The slip property was increased by the silicon-containing polymer, thereby increasing friction durability.

INDUSTRIAL APPLICABILITY

The present invention is suitably applied for forming a surface-treating layer on a surface of various base materials, in particular, an optical member in which transparency is required.

The invention claimed is:

1. A composition comprising:
    (A) at least one fluorine-containing polymer having a curable moiety, and
    (B) at least one silicon-containing polymer having a curable moiety,
    wherein the fluorine-containing polymer (A) is at least one fluorine-containing polymer of any one of the following general formulae (A1) and (A2):

$$Rf—R^1—R^2—R^3—(R^4)_{n1}—R^5—R^6 \quad (A1)$$

$$R^6—R^5—(R^4)_{n1}—R^3—R^2—R^1—R^2—R^3—(R^4)_{n1}—R^5—R^6 \quad (A2)$$

wherein:
    Rf represents an alkyl having 1-16 carbon atoms which may be substituted by one or more fluorine atoms;
    $R^1$ is a group of the following formula:

$$—(OC_4F_8)_w—(OC_3F_6)_a—(OC_2F_4)_b—(OCF_2)_c—$$

wherein a, b, c and w are each independently an integer of 0 or more and 200 or less, the sum of a, b, c and w is 1 or more and the occurrence order of the respective repeating units in parentheses is not limited in the formula;
    $R^2$ is a group of the following formula:

$$-(Q)_d-(CFZ)_e—(CH_2)_f—$$

wherein Q represents an oxygen atom, phenylene, carbazolylene, —$NR^a$— wherein $R^a$ represents a hydrogen atom or an organic group, or a divalent polar group,
    Z represents a hydrogen atom, a fluorine atom or a lower fluoroalkyl group, and
    d, e and f are each independently an integer of 0 or more and 50 or less, the sum of d, e and f is 1 or more, the occurrence order of the respective repeating units in parentheses is not limited in the formula;
    $R^3$ represents a divalent organic group;
    $R^4$ represents, each independently at each occurrence, $R^{4a}$ or $R^{4b}$: provided that at least one of $R^4$ is $R^{4a}$,
    $R^{4a}$ is a group of the following formula:

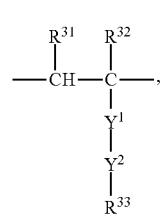

wherein $R^{31}$ represents, each independently at each occurrence, a hydrogen atom or an alkyl group,
    $R^{32}$ represents, each independently at each occurrence, a hydrogen atom or an alkyl group, $R^{33}$ represents, each independently at each occurrence, an organic group having a curable moiety, $Y^1$ represents —O—, —N($R^c$)—, phenylene or carbazolylene, $R^c$ represents an organic group, and $Y^2$ represents a linker wherein the number of atoms of the main backbone is 1-16;

$R^{4b}$ represents, each independently at each occurrence, a divalent organic group having no curable moiety;

n1 is an integer of 1 or more and 50 or less;

$R^5$ represents —O—, —S—, —NH— or a bond;

$R^6$ represents Rf—R'—R²— wherein Rf, $R^1$ and $R^2$ are as defined above, a monovalent organic group or a hydrogen atom, and the silicon-containing polymer (B) is at least one silicon-containing polymer of any one of the following general formulae (B1) and (B2):

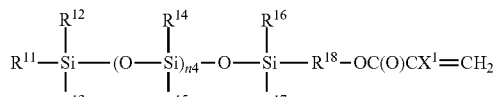

(B1)

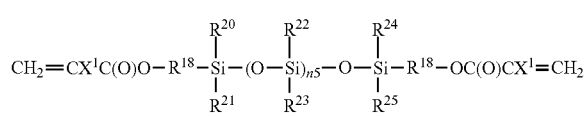

(B2)

wherein $R^{11}$, $R^{12}$, $R^{13}$, $R^{14}$, $R^{15}$, $R^{16}$, $R^{17}$, $R^{20}$, $R^{21}$, $R^{22}$, $R^{23}$, $R^{24}$ and $R^{25}$ represent each independently an alkyl group or an aryl group;

$R^{18}$ represents a divalent organic group;

$X^1$ represents a hydrogen atom, a chlorine atom, a fluorine atom, or an alkyl having 1-10 carbon atoms which may be substituted by a fluorine atom, and n4 and n5 are each independently an integer of 1 or more and 500 or less.

2. The composition according to claim 1 wherein the fluorine-containing polymer (A1) and (A2) are at least one fluorine-containing polymer of any one of the following general formulae (A1a) and (A2a), respectively:

wherein Rf, $R^1$, $R^3$, $R^6$, $X^1$, Z and n1 are as defined in claim 1, g is 0 or 1, h is 1 or 2, and q1 is one or more and 5 or less.

3. The composition according to claim 1 wherein Rf is a perfluoroalkyl group having 1-16 carbon atoms.

4. The composition according to claim 1 wherein the silicon-containing polymer (B) has a number average molecular weight of 500 or more and 20,000 or less.

5. The surface treatment composition according to claim 1 comprising the fluorine-containing polymer (A) at 60% by mass or more with respect to the total mass of the fluorine-containing polymer (A) and the silicon-containing polymer (B).

6. The composition according to claim 1 further comprising at least one fluorine-containing oil of the following general formula (C):

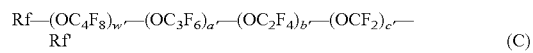

(C)

wherein Rf an alkyl having 1-16 carbon atoms which may be substituted by one or more fluorine atoms, Rf' represents a hydrogen atom, a fluorine atom, or an alkyl having 1-16 carbon atoms which may be substituted by one or more fluorine atoms, a', b', c' and w' are each independently an integer of 0 or more and 300 or less, the sum of a', b', c' and w' is 1 or more and the occurrence order of the respective repeating units in parentheses is not limited in the formula, at 40% by mass or less with respect to the total mass of the fluorine-containing polymer (A) and the fluorine-containing oil (C).

7. The composition according to claim 1 further comprising a solvent of 5-10,000 parts by mass with respect to the total 100 parts by mass of the fluorine-containing polymer (A) and the silicon-containing polymer (B), and if present the fluorine-containing oil (C).

8. The composition according to claim 1 further comprising an active energy curing initiator.

9. An article comprising a base material and a layer which is formed on a surface of the base material from the composition according to claim 1.

10. The article according to claim 9 which is an optical member.

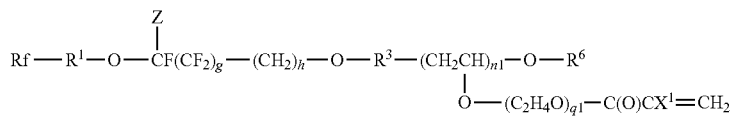

(A1a)

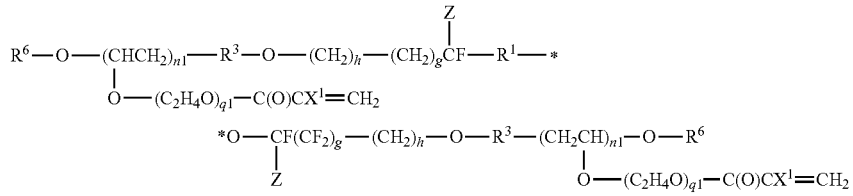

(A2a)

11. A curable composition comprising the composition according to claim 1 in a matrix forming composition at 0.01-10% by mass with respect to the total mass of the matrix forming composition and the composition according to claim 1.

12. An article comprising a base material and a layer which is formed on a surface of the base material from the curable composition according to claim 11.

13. The article according to claim 12 which is an optical member.

* * * * *